(12) United States Patent
Sakai

(10) Patent No.: US 8,301,875 B2
(45) Date of Patent: Oct. 30, 2012

(54) NETWORK, IPSEC SETTING SERVER APPARATUS, IPSEC PROCESSING APPARATUS, AND IPSEC SETTING METHOD USED THEREFOR

(75) Inventor: Masanao Sakai, Tokyo (JP)

(73) Assignee: NEC Infrontia Coropration, Kanagawa (JP)

( * ) Notice: Subject to any disclaimer, the term of this patent is extended or adjusted under 35 U.S.C. 154(b) by 832 days.

(21) Appl. No.: 10/655,372

(22) Filed: Sep. 5, 2003

(65) Prior Publication Data

US 2004/0093524 A1    May 13, 2004

(30) Foreign Application Priority Data

Sep. 11, 2002    (JP) ................... 2002-264913

(51) Int. Cl.
*H04L 29/06* (2006.01)
(52) U.S. Cl. ............... 713/153; 713/151; 726/2; 726/3; 726/4; 709/225
(58) Field of Classification Search ............... 713/1, 2, 713/188, 194, 151, 153; 380/200, 201, 255, 380/277; 726/2–4; 709/225
See application file for complete search history.

(56) References Cited

U.S. PATENT DOCUMENTS

| | | | |
|---|---|---|---|
| 6,175,917 B1* | 1/2001 | Arrow et al. ................. 713/1 |
| 6,253,321 B1 | 6/2001 | Nikander et al. |
| 6,678,827 B1* | 1/2004 | Rothermel et al. .......... 726/6 |
| 6,826,616 B2* | 11/2004 | Larson et al. ............... 709/228 |
| 6,931,529 B2* | 8/2005 | Kunzinger ................... 713/153 |
| 6,986,061 B1* | 1/2006 | Kunzinger ................... 709/225 |
| 7,068,640 B2* | 6/2006 | Kakemizu et al. ........... 370/349 |
| 7,171,000 B1* | 1/2007 | Toh et al. .................... 380/278 |
| 7,391,782 B2* | 6/2008 | Oguchi ....................... 370/400 |
| 7,440,452 B1* | 10/2008 | Giniger et al. .............. 370/389 |
| 7,447,901 B1* | 11/2008 | Sullenberger et al. ...... 713/153 |
| 7,477,748 B2* | 1/2009 | Schmidt ...................... 380/279 |
| 7,657,531 B2* | 2/2010 | Bisbee et al. ................. 726/4 |
| 2001/0042201 A1* | 11/2001 | Yamaguchi et al. ......... 713/151 |
| 2001/0042204 A1 | 11/2001 | Blaker et al. |
| 2002/0157024 A1* | 10/2002 | Yokote ........................ 713/201 |
| 2003/0126466 A1* | 7/2003 | Park et al. ................... 713/201 |
| 2003/0147536 A1* | 8/2003 | Andivahis et al. .......... 380/277 |
| 2003/0191963 A1* | 10/2003 | Balissat et al. .............. 713/201 |
| 2004/0181690 A1* | 9/2004 | Rothermel et al. .......... 713/201 |
| 2005/0193103 A1* | 9/2005 | Drabik ........................ 709/221 |

FOREIGN PATENT DOCUMENTS

| | | |
|---|---|---|
| JP | 2001-127759 A | 5/2001 |
| JP | 2001-298449 | 10/2001 |
| JP | 2001-298449 A | 10/2001 |
| JP | 2002-217896 A | 8/2002 |
| WO | WO 99/67930 A2 | 12/1999 |

* cited by examiner

*Primary Examiner* — Aravind Moorthy
*Assistant Examiner* — Joseph Pan
(74) *Attorney, Agent, or Firm* — Foley & Lardner LLP

(57) ABSTRACT

There is provided an IPsec setting server apparatus capable of preventing inconsistency of setting among communicating apparatuses. An IPsec processing section subjects a data communication packet received from an interface section to IPsec processing. An SPD is referred to from the IPsec processing section and records policies for applying the IPsec. An SAD is referred to from the IPsec processing section and records an SA necessary for subjecting an individual kind of communication to the IPsec processing. A request processing section receives a setting request message from the IPsec processing apparatus and returns a distribution message. IPsec policies necessary for determining a requested setting are stored in a distribution policy storage section. Information on respective kinds of SA communication requested to be set is stored in a management table.

18 Claims, 29 Drawing Sheets

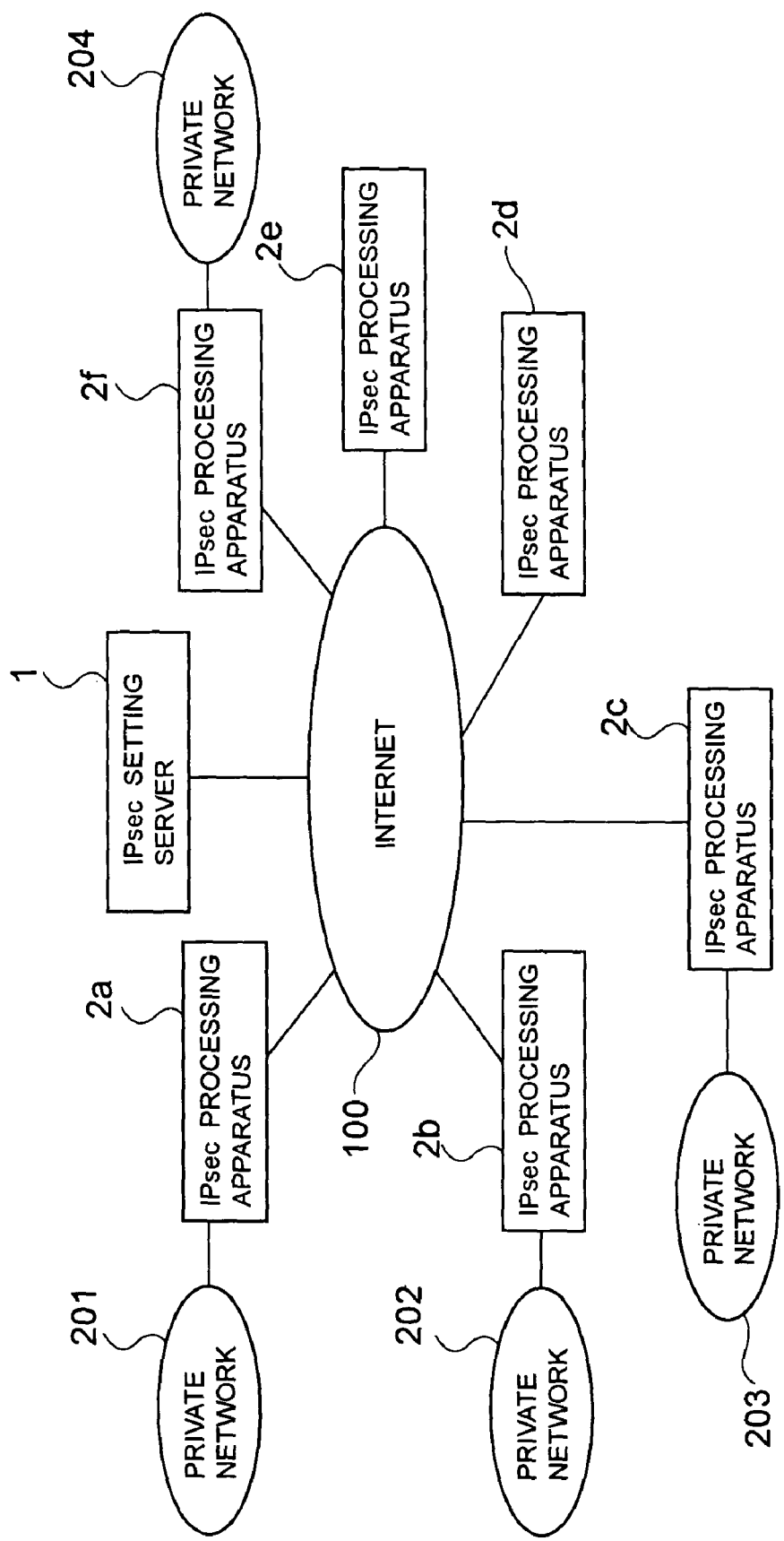

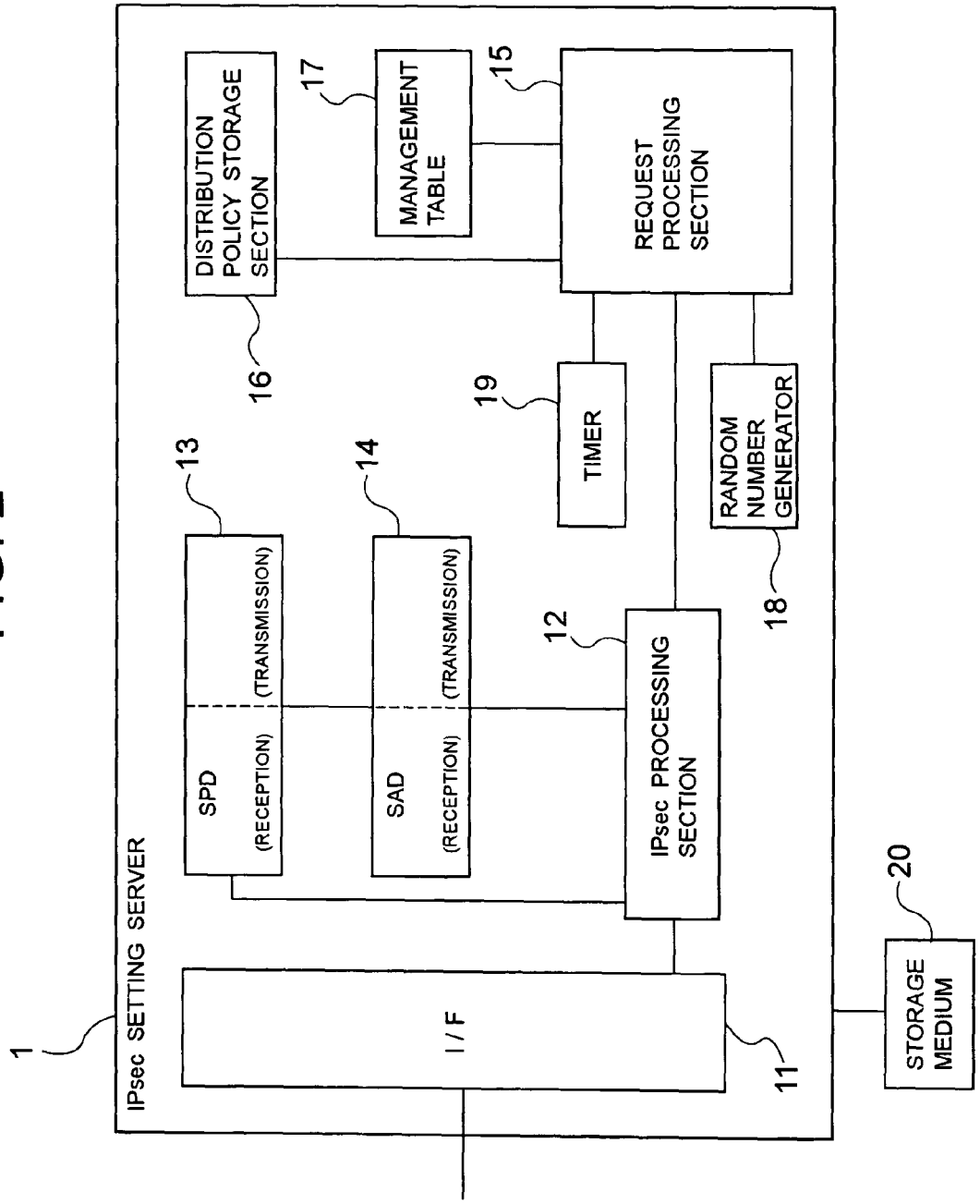

FIG. 3

| ADDRESS PAIR | | DISTRIBUTION POLICY | |
|---|---|---|---|
| IPsec PROCESSING APPARATUS 2a | IPsec PROCESSING APPARATUS 2b | IPsec PROTOCOL<br>ENCAPSULATION MODE<br>ENCRYPTION ALGORITHM<br>AUTHENTICATION ALGORITHM<br>TERM OF VALIDITY OF SA | ESP<br>TUNNEL MODE<br>DES-CBC<br>HMAC-MD5-96<br>3600 SECONDS | DISTRIBUTION POLICY (a) |
| IPsec PROCESSING APPARATUS 2d | IPsec PROCESSING APPARATUS 2c | IPsec PROTOCOL<br>ENCAPSULATION MODE<br>ENCRYPTION ALGORITHM<br>AUTHENTICATION ALGORITHM<br>TERM OF VALIDITY OF SA | ESP<br>TRANSPORT MODE<br>3DES-CBC<br>HMAC-SHA-1-96<br>3600 SECONDS | DISTRIBUTION POLICY (b) |

FIG. 4

| ID | REQUEST SOURCE ADDRESS | OPPOSITE PARTY ADDRESS | REQUEST ID | SPI | SETTING PARAMETERS | |
|---|---|---|---|---|---|---|
| 1 | IPsec PROCESSING APPARATUS 2a | IPsec PROCESSING APPARATUS 2b | 1001 | 5100 | APPLICATION POLICY<br>SA PARAMETER FOR 2a → 2b<br>SA PARAMETER FOR 2b → 2a | DISTRIBUTION POLICY (a)<br>SA PARAMETER (a)<br>SA PARAMETER (b) |
|  | IPsec PROCESSING APPARATUS 2b | IPsec PROCESSING APPARATUS 2a | 2001 | 6100 | | |
| 2 | IPsec PROCESSING APPARATUS 2a | IPsec PROCESSING APPARATUS 2b | 1002 | 5110 | APPLICATION POLICY<br>SA PARAMETER FOR 2a → 2b<br>SA PARAMETER FOR 2b → 2a | DISTRIBUTION POLICY (a) |
|  | IPsec PROCESSING APPARATUS 2b | IPsec PROCESSING APPARATUS 2a | | | | |
| 3 | | | | | | |

FIG. 5

| IPsec PROTOCOL | ESP |
|---|---|
| ENCAPSULATION MODE | TUNNEL MODE |
| ENCRYPTION ALGORITHM | DES - CBC |
| AUTHENTICATION ALGORITHM | HMAC - MD5 - 96 |
| TERM OF VALIDITY | 3600 SECONDS |
| ENCRYPTION KEY | 0x7d5e837ad . . . |
| AUTHENTICATION KEY | 0x89e562bfc . . . |
| IV | 0xc32fbe004 . . . |
| RECEPTION SIDE SPI | 6100 |

FIG. 6

| MESSAGE TYPE | REQUEST MESSAGE |
|---|---|
| ID | 1001 |
| REQUEST SOURCE ADDRESS | IPsec PROCESSING APPARATUS 2a |
| OPPOSITE PARTY ADDRESS | IPsec PROCESSING APPARATUS 2b |
| SPI | 5100 |

FIG. 7

| MESSAGE TYPE | DISTRIBUTION MESSAGE |
|---|---|
| ID | 1001 |
| REQUEST SOURCE ADDRESS | IPsec PROCESSING APPARATUS 2a |
| OPPOSITE PARTY ADDRESS | IPsec PROCESSING APPARATUS 2b |
| SETTING PARAMETER | |
| OPERATION POLICY | DISTRIBUTION POLICY (a) |
| SA PARAMETER FOR 2a → 2b | SA PARAMETER (a) |
| SA PARAMETER FOR 2b → 2a | SA PARAMETER (b) |

FIG. 8

| MESSAGE TYPE | REQUEST STARTUP MESSAGE |
|---|---|
| OPPOSITE PARTY ADDRESS | IPsec PROCESSING APPARATUS 2a |

FIG. 9

| MESSAGE TYPE | NO CORRESPONDING ENTRY ERROR MESSAGE |
|---|---|
| ID | 1001 |
| REQUEST SOURCE ADDRESS | IPsec PROCESSING APPARATUS 2a |
| OPPOSITE PARTY ADDRESS | IPsec PROCESSING APPARATUS 2b |

FIG. 10

| MESSAGE TYPE | CONTENT INCONSISTENCY ERROR MESSAGE | |
|---|---|---|
| ID | 1001 | |
| REQUEST SOURCE ADDRESS | IPsec PROCESSING APPARATUS 2a | |
| OPPOSITE PARTY ADDRESS | IPsec PROCESSING APPARATUS 2b | |
| ENTRY LIST | ID | SPI |
| | 1001 | 5100 |
| | 1002 | 5110 |

FIG. 11

| MESSAGE TYPE | NO - RESPONSE ERROR MESSAGE |
|---|---|
| ID | 1001 |
| REQUEST SOURCE ADDRESS | IPsec PROCESSING APPARATUS 2a |
| OPPOSITE PARTY ADDRESS | IPsec PROCESSING APPARATUS 2b |

FIG. 15

| ID | SELECTOR | PROCESS | IPsec APPLICATION POLICY | OPPOSITE PARTY ADDRESS FOR SETTING REQUEST |
|---|---|---|---|---|
| 1 | APPARATUS OF ITS OWN → SETTING SERVER 1 | IPsec | APPLICATION POLICY (z) | |
| 2 | TO PRIVATE NETWORK 202 | IPsec | | IPsec PROCESSING APPARATUS 2b |
| 3 | TO PRIVATE NETWORK 203 | IPsec | | IPsec PROCESSING APPARATUS 2c |
| 4 | ALL OTHER THAN THE ABOVE | PASS | | |

FIG. 16

| IPsec APPLICATION POLICY | |
|---|---|
| IPsec PROTOCOL | ESP |
| ENCAPSULATION MODE | TRANSPORT MODE |
| OPPOSITE PARTY ADDRESS | SETTING SERVER 1 |
| ENCRYPTION ALGORITHM | AES - CBC |
| AUTHENTICATION ALGORITHM | HMAC - SHA - 1 - 96 |
| TERM OF VALIDITY OF SA | 3600 SECONDS |
| IKE POLICY | |
| OPPOSITE PARTY IPsec PROCESSING APPARATUS ADDRESS | SETTING SERVER 1 |
| OPPOSITE PARTY AUTHENTICATION SYSTEM | PRIOR COMMON SECRET KEY |
| PRIOR COMMON SECRET KEY | password - for - ike |
| ENCRYPTION ALGORITHM | DES - CBC |
| HASH ALGORITHM | MD5 |
| Oakley GROUP | 1536 BIT MODP GROUP |
| TERM OF VALIDITY OF SA | 3600 SECONDS |

FIG. 17

| ID | KEY PARAMETERS | | | SA PARAMETERS | |
|---|---|---|---|---|---|
| | TERMINAL ADDRESS | IPsec | SPI | | |
| 1 | IPsec PROCESSING APPARATUS 2b | ESP | 6100 | ENCAPSULATION MODE<br>ENCRYPTION ALGORITHM<br>AUTHENTICATION ALGORITHM<br>ENCRYPTION KEY<br>AUTHENTICATION KEY<br>IV<br>TERM OF VALIDITY<br>SEQUENCE NUMBER | TUNNEL MODE<br>DES - CBC<br>HMAC - MD5 - 96<br>0x7d5e837ad....<br>0x83e562bfc....<br>0xc32fbe004....<br>3600 SECONDS<br>0 |
| 2 | SETTING SERVER 1 | ESP | 6100 | ENCAPSULATION MODE<br>ENCRYPTION ALGORITHM<br>AUTHENTICATION ALGORITHM<br>ENCRYPTION KEY<br>AUTHENTICATION KEY<br>IV<br>TERM OF VALIDITY<br>SEQUENCE NUMBER | TRANSPORT MODE<br>AES - CBC<br>HMAC - SHA - 96<br>0xda738e5d7....<br>0xcfb265c98....<br>0xc399ebf22....<br>3600 SECONDS<br>2133 |
| 3 | | | | | |

FIG.21

| ID | SELECTOR | PROCESSING | IPsec APPLICATION POLICY |
|----|----------|------------|--------------------------|
| 1 | IPsec SETTING SERVER 1 → IPsec PROCESSING APPARATUS 2a | IPsec | APPLICATION POLICY (v) |
| 2 | IPsec SETTING SERVER 1 → IPsec PROCESSING APPARATUS 2b | IPsec | APPLICATION POLICY (w) |
| 3 | IPsec SETTING SERVER 1 → IPsec PROCESSING APPARATUS 2c | IPsec | APPLICATION POLICY (x) |
| 4 | IPsec SETTING SERVER 1 → IPsec PROCESSING APPARATUS 2d | IPsec | APPLICATION POLICY (y) |
| 5 | ALL OTHER THAN THE ABOVE | DISPOSAL | |

FIG. 22

| IPsec APPLICATION POLICY | |
|---|---|
| IPsec PROTOCOL | ESP |
| ENCAPSULATION MODE | TRANSPORT MODE |
| OPPOSITE PARTY ADDRESS | IPsec PROCESSING APPARATUS 2a |
| ENCRYPTION ALGORITHM | AES - CBC |
| AUTHENTICATION ALGORITHM | HMAC - SHA - 1 - 96 |
| TERM OF VALIDITY OF SA | 3600 SECONDS |
| IKE POLICY | |
| OPPOSITE PARTY IPsec PROCESSING APPARATUS ADDRESS | IPsec PROCESSING APPARATUS 2A |
| OPPOSITE PARTY RECOGNITION SYSTEM | PRIOR COMMON SECRET KEY |
| PRIOR COMMON SECRET KEY | password - for - ike |
| ENCRYPTION ALGORITHM | DES - CBC |
| HASH ALGORITHM | MD5 |
| Oakley GROUP | 1536 BIT MODP GROUP |
| TERM OF VALIDITY OF SA | 3600 SECONDS |

FIG. 23

| ID | SELECTOR | PROCESSING | IPsec APPLICATION POLICY |
|----|----------|------------|--------------------------|
| 1 | TO PRIVATE NETWORK 202 | IPsec | APPLICATION POLICY (j) |
| 2 | TO PRIVATE NETWORK 203 | IPsec | APPLICATION POLICY (k) |
| 3 | ALL OTHER THAN THE ABOVE | PASS | |

FIG. 24

| IPsec APPLICATION POLICY | |
|---|---|
| IPsec PROTOCOL | ESP |
| ENCAPSULATION MODE | TUNNEL MODE |
| OPPOSITE PARTY ADDRESS | IPsec PROCESSING APPARATUS 2b |
| ENCRYPTION ALGORITHM | AES - CBC |
| AUTHENTICATION ALGORITHM | HMAC - MD5 - 96 |
| TERM OF VALIDITY OF SA | 3600 SECONDS |
| IKE POLICY | |
| OPPOSITE PARTY IPsec PROCESSING APPARATUS ADDRESS | IPsec PROCESSING APPARATUS 2b |
| OPPOSITE PARTY AUTHENTICATION SYSTEM | PRIOR COMMON SECRET KEY |
| PRIOR COMMON SECRET KEY | password |
| ENCRYPTION ALGORITHM | DES - CBC |
| HASH ALGORITHM | MD5 |
| Oakley GROUP | 1536 BIT MODP GROUP |
| TERM OF VALIDITY OF SA | 3600 SECONDS |

FIG.25

| ID | REQUEST SOURCE ADDRESS | OPPOSITE PARTY ADDRESS | REQUEST ID | SPI | SETTING PARAMETERS | DISTRIBUTION POLICY (a) |
|---|---|---|---|---|---|---|
| 1 | IPsec PROCESSING APPARATUS 2a | IPsec PROCESSING APPARATUS 2b | 1001 | 5100 | APPLICATION POLICY<br>SA PARAMETER FOR 2a → 2b<br>SA PARAMETER FOR 2b → 2a | |
| 2 | IPsec PROCESSING APPARATUS 2b | IPsec PROCESSING APPARATUS 2a | | | APPLICATION POLICY | |
| 3 | | | | | | |

FIG. 26

| ID | SELECTOR | PROCESSING | IPsec APPLICATION POLICY | OPPOSITE PARTY ADDRESS FOR SETTING REQUEST |
|---|---|---|---|---|
| 1 | APPARATUS OF ITS OWN → SETTING SERVER 1 | IPsec | APPLICATION POLICY (z) | |
| 2 | TO PRIVATE NETWORK 202 | IPsec | APPLICATION POLICY (a) | IPsec PROCESSING APPARATUS 2b |
| 3 | TO PRIVATE NETWORK 203 | IPsec | | IPsec PROCESSING APPARATUS 2c |
| 4 | ALL OTHER THAN THE ABOVE | PASS | | |

FIG. 27

| ID | REQUEST SOURCE ADDRESS | OPPOSITE PARTY ADDRESS | REQUEST ID | SPI | SETTING PARAMETERS | |
|---|---|---|---|---|---|---|
| 1 | IPsec PROCESSING APPARATUS 2a | IPsec PROCESSING APPARATUS 2b | 1001 | 5100 | APPLICATION POLICY SA PARAMETER FOR 2a → 2b SA PARAMETER FOR 2b → 2a | DISTRIBUTION POLICY (a) SA PARAMETER (a) SA PARAMETER (b) |
| | IPsec PROCESSING APPARATUS 2b | IPsec PROCESSING APPARATUS 2a | 2001 | 6100 | | |
| 2 | IPsec PROCESSING APPARATUS 2a | IPsec PROCESSING APPARATUS 2b | 1002 | 5110 | APPLICATION POLICY SA PARAMETER FOR 2a → 2b SA PARAMETER FOR 2b → 2a | DISTRIBUTION POLICY (a) SA PARAMETER (c) SA PARAMETER (d) |
| | IPsec PROCESSING APPARATUS 2b | IPsec PROCESSING APPARATUS 2a | 2002 | 6110 | | |
| 3 | | | | | | |

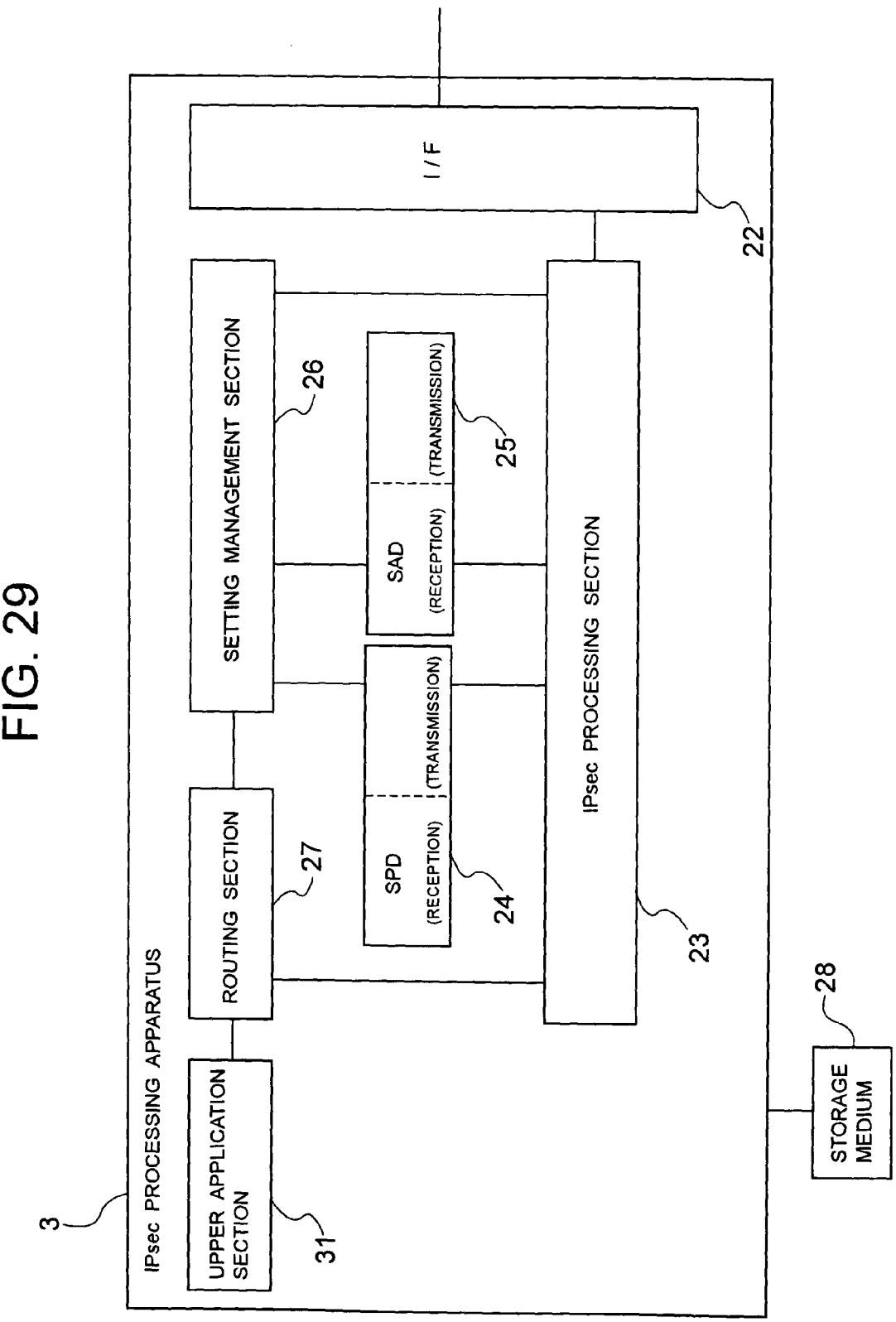

FIG. 30

| ADDRESS PAIR | | DISTRIBUTION POLICY | |
|---|---|---|---|
| IPsec PROCESSING APPARATUS 2d | IPsec PROCESSING APPARATUS 2e | IPsec PROTOCOL<br>ENCAPSULATION MODE<br>ENCRYPTION ALGORITHM<br>AUTHENTICATION ALGORITHM<br>TERM OF VALIDITY OF SA | ESP<br>TRANSPORT MODE<br>3DES - CBC<br>HMAC - SHA - 1 - 96<br>3600 SECONDS | DISTRIBUTION POLICY (b) |
| ALL OTHER THAN THE ABOVE | | IPsec PROTOCOL<br>ENCAPSULATION MODE<br>ENCRYPTION ALGORITHM<br>AUTHENTICATION ALGORITHM<br>TERM OF VALIDITY OF SA | ESP<br>TUNNEL MODE<br>DES - CBC<br>HMAC - MD5 - 96<br>3600 SECONDS | DISTRIBUTION POLICY (a) |

NETWORK, IPSEC SETTING SERVER APPARATUS, IPSEC PROCESSING APPARATUS, AND IPSEC SETTING METHOD USED THEREFOR

BACKGROUND OF THE INVENTION

1. Field of the Invention

The present invention relates to a network, an IPsec setting server apparatus, an IPsec processing apparatus, and an IPsec setting method used therefor, and in particular to a network structure according to an IPsec (Internet Protocol security protocol) which provides functions such as confidentiality, integrity, and authentication on the Internet.

2. Description of the Related Art

Conventionally, as the Internet spreads widely, there is increasing desire to secure security on the Internet. In particular, many companies desire to establish a virtual private network on the Internet and establish a network connecting offices or the like in remote places at low cost instead of establishing a network using an expensive private line.

In response to such desire, the IPsec (Internet Protocol security protocol) which provides functions such as confidentiality, integrity, and authentication on the Internet is standardized by the IETF (Internet Engineering Task Force) (e.g., see pages 8 to 11 and FIG. 1 of Japanese Patent Laid-Open No. 2001-298449).

In the case where different two centers communicate via the Internet, it becomes possible to secure security on the Internet path by using the IPsec. It becomes essential to support a new Internet protocol, IPv6 (Internet Protocol version 6), with the IPsec, and it is expected that a larger number of network apparatuses will be associated with the IPsec, and communication using the IPsec will also increase from now on.

FIG. 31 shows a structure of an IPsec processing apparatus which performs communication using this IPsec. In FIG. 31, an IPsec processing apparatus 4 includes interface sections (I/Fs) 41 and 42, an IPsec processing section 43, an SPD (Security Policy Database) 44, an SAD (Security Association Database) 45, and a routing section 46.

The interface section 41 is connected to a private network to perform data communication with the private network. The interface section 42 is connected to the Internet to perform data communication via the Internet.

The IPsec processing section 43 subjects a data communication packet received from the interface sections 41 and 42 to IPsec processing. The SPD 44 is referred to from the IPsec processing section 43 and stores a policy for applying the IPsec. The SAD 45 is referred to from the IPsec processing section 43 and stores an SA(Security Assosiation), which is necessary for subjecting individual communication to the IPsec processing. The routing section 46 transmits and receives data communication packets to and from the IPsec processing section 43 and determines transfer destinations of the respective data communication packets.

However, in the above-described network structure according to the conventional IPsec, in the case where one IPsec processing apparatus carries out IPsec communication with a large number of opposite parties, contents to be set in the apparatus carrying out the IPsec processing increase in the connection by the IPsec.

In order to use the IPsec, it is necessary to set a service [service provided by an AH (Authentication Header), an ESP (Encapsulating Security Payload)], an algorithm, and the like to be used for communication, to which the IPsec is applied, in apparatuses at both ends to which the IPsec processing is applied, respectively.

In the case where an automatic key management (IKE: Internet Key Exchange) protocol is used, it is also necessary to set an encryption algorithm, a hash algorithm, a key common algorithm, and the like, which are used in the automatic key management protocol, in the apparatuses at both the ends. Since these settings are required for each opposite party to be connected by the IPsec, as opposite parties to be connected by the IPsec increase, more settings are required.

In addition, in the network structure according to the conventional IPsec, it is likely that different settings are made at both ends of communication to which the IPsec is applied. In the apparatuses at both the ends to which the IP processing is applied, in the case where the setting of a service to be used or the setting of an algorithm to be used is different, the apparatuses cannot perform communication. When kinds of communication to which the IPsec is applied increase, since the number of settings also increases, it becomes more likely that such an error occurs.

Moreover, in the network structure according to the conventional IPsec, in the case where the automatic key management protocol is used, an arithmetic operation for generating a common secret key takes time and, as a result, it takes long time until communication is started. Usually, in the IPsec processing apparatus, as shown in FIG. 32, since generation of the common secret key is not started until communication becomes necessary, if the generation of the common secret key takes time, it takes long until the start of communication.

Furthermore, in the network structure according to the conventional IPsec, in the casewhere the automatic key management protocol is used, arithmetic operation load is generated in the apparatuses to which the IPsec processing is applied. Since a large number of arithmetic operations are necessary in order to generate the common secret key, performance of other functions (transfer function of a packet to which the IPsec is not applied, etc.)provided in the apparatuses decreases. When kinds of IPsec communication to be treated simultaneously increase, chances of generating the common secret key also increase, and a rate of decrease in the performance becomes larger.

BRIEF SUMMARY OF THE INVENTION

Thus, it is an object of the present invention to solve the above-described problems and provide a network, an IPsec setting server apparatus, an IPsec processing apparatus, and an IPsec setting method used therefor which can prevent inconsistency of settings among apparatuses communicating with each other.

In addition, it is another object of the present invention to provide a network, an IPsec setting server apparatus, an IPsec processing apparatus, and an IPsec setting method used therefor which can perform encryption and decryption after setting a policy without delay and can receive a packet from a transmission source without failure.

Further, it is another object of the present invention to provide a network, an IPsec setting server apparatus, an IPsec processing apparatus, and an IPsec setting method used therefor which can make a secret key arithmetic operation unnecessary to reduce a connection time of an IPsec path at the time of starting communication in respective apparatuses and can prevent decrease in performance.

A network in accordance with the present invention is a network including: IPsec processing apparatuses, which use an IPsec (Internet Protocol security protocol) for securing security on the Internet path in the case where different two centers communicate via the Internet; and an IPsec setting server apparatus, which manages IPsec settings of the IPsec processing apparatuses, in which the IPsec setting server apparatus includes means for collectively managing policies of the IPsec to be applied among the IPsec processing apparatuses.

In another network in accordance with the present invention, in addition to the above-described structure, the IPsec setting server apparatus includes means for, upon receiving a request message, transmitting a request startup message to an IPsec processing apparatus of an opposite party of an IPsec processing apparatus, which has transmitted the request message, in order to cause the IPsec processing apparatus to transmit a request message for the communication.

In another network in accordance with the present invention, in addition to the above-described structure, the IPsec setting server apparatus includes means for generating a common secret key to be used in encryption and authentication of the IPsec, and a function for distributing the generated common secret key to the IPsec processing apparatuses.

An IPsec setting server apparatus in accordance with the present invention is an IPsec setting server apparatus for managing IPsec settings of IPsec processing apparatuses, which use an IPsec (Internet Protocol security protocol) for securing security on the Internet path in the case where different two centers communicate via the Internet, which includes means for collectively managing policies of the IPsec to be applied among the IPsec processing apparatuses.

Another IPsec setting server apparatus in accordance with the present invention includes, in addition to the above-described structure, means for, upon receiving a request message, transmitting a request startup message to an IPsec processing apparatus of the opposite party of an IPsec processing apparatus, which has transmitted the request message, in order to cause the IPsec processing apparatus to transmit a request message for the communication.

Another IPsec setting server apparatus in accordance with the present invention includes, in addition to the above-described structure, means for generating a common secret key to be used in encryption and authentication of the IPsec, and a function for distributing the generated common secret key to the IPsec processing apparatuses.

An IPsec processing apparatus in accordance with the present invention is an IPsec processing apparatus using an IPsec (Internet Protocol security protocol) on the Internet, which includes means for, upon receiving a packet to which the IPsec should be applied, judging whether or not to inquire an IPsec setting server apparatus of a setting concerning the IPsec collectively managed in the IPsec setting server apparatus.

Another IPsec processing apparatus in accordance with the present invention performs, in the above-described structure, upon receiving a request startup message for causing the IPsec setting server apparatus to transmit a request message, transmission of the request message.

Another IPsec processing apparatus in accordance with the present invention includes, in addition to the above-described structure, means for acquiring a common secret key to be used in encryption and authentication of the IPsec from the above-described IPsec setting server apparatus.

An IPsec setting method in accordance with the present invention is an IPsec setting method for a network including: IPsec processing apparatuses, which use an IPsec (Internet Protocol security protocol) for securing security on the Internet path in the case where different two centers communicate via the Internet; and an IPsec setting server apparatus, which manages IPsec settings of the IPsec processing apparatuses, in which the IPsec setting server apparatus includes a step of collectively managing policies of the IPsec to be applied among the IPsec processing apparatuses.

In another IPsec setting method in accordance with the present invention, in the above-described operation, the IPsec setting server apparatus includes a step of, upon receiving a request message, sending a request startup message to an IPsec processing apparatus of an opposite party of an IPsec processing apparatus, which has transmitted the request message, in order to cause the IPsec processing apparatus to transmit a request message for the communication.

In another IPsec setting method in accordance with the present invention, in addition to the above-described step, the IPsec setting server apparatus includes a step of generating a common secret key to be used in encryption and authentication of the IPsec, and a step of distributing the generated common secret key to the IPsec processing apparatuses.

That is, in the IPsec processing apparatuses using the IPsec (Internet Protocol security protocol) on the Internet, the IPsec setting method of the present invention collectively registers policies to be set in the respective IPsec processing apparatuses in the IPsec setting server, thereby reducing the number of policies to be set in the respective IPsec processing apparatuses.

In addition, in the above-described structure, upon receiving a request message, the IPsec setting method of the present invention transmits a request startup message to an IPsec processing apparatus of the opposite party of communication of an IPsec processing apparatus, which has transmitted the request message, in order to cause the IPsec processing apparatus to transmit a request message for the communication, whereby setting of a policy of the IPsec to be applied among the respective IPsec processing apparatuses is performed substantially simultaneously in those apparatuses, and it becomes possible to perform encryption and decryption after the policy setting without delay. Consequently, it becomes possible to receive a packet from a transmission source in an IPsec processing apparatus of a transmission destination without failure.

Moreover, in the above-described structure, the IPsec setting method of the present invention transmits a no-response error message to the IPsec processing apparatus of the transmission source unless the IPsec setting server does not receive a request message responding to a request startup message when the request startup message is transmitted. Therefore, it becomes possible to recognize non-existence of an opposed apparatus in the IPsec processing apparatus of the transmission source.

Furthermore, in the above-described structure, in the IPsec setting method of the present invention, the respective IPsec processing apparatuses acquires a common secret key to be used in encryption and authentication of the IPsec from the IPsec setting server, whereby a complicated key exchange arithmetic operation is eliminated, and a time until the start of the IPsec processing is reduced.

More specifically, in the IPsec setting method of the present invention, the IPsec setting server stores a policy of the IPsec to be applied among the respective IPsec processing apparatuses. In transmitting a data communication packet to an IPsec processing apparatus of the opposite party, the IPsec processing apparatus of the transmission source requests the IPsec setting server to perform necessary setting. The IPsec setting server having received the request instructs the IPsec processing apparatus of the opposite party to request setting.

Upon receiving the request from the IPsec processing apparatus of the opposite party, the IPsec setting server transmits the registered policy, an SPI (Security Parameters Index) informed by both the IPsec processing apparatuses of the transmission source and the opposite party, and the common secret key generated by the IPsec setting server to the respective IPsec processing apparatuses. At this point, all pieces of information necessary for the IPsec processing are collected in both the IPsec processing apparatuses of the transmission source and the opposite party, and it becomes possible to execute the IPsec processing. Note that transmission and the reception of setting information are protected by the conventional IPsec to be thereby prevented from being tapped by a third party.

In this way, in the present invention, IPsec policies are collectively managed in the IPsec-setting server, whereby it becomes possible to reduce the total number of settings and, at the same time, and to prevent communication failure caused by difference of contents of settings between two centers.

In addition, in the present invention, since a request startup message is transmitted, in an IPsec processing apparatus opposed to an IPsec processing apparatus of a transmission source of a request message, setting of a policy of the IPsec is performed substantially simultaneously with setting of a policy of the IPsec in an IPsec processing apparatus of the transmission source. If the IPsec processing apparatus of the transmission source encrypts and transmits a packet after setting the policy, it becomes possible to decrypt and receive the packet from the IPsec processing apparatus of the transmission source in the opposed IPsec processing apparatus. Consequently, it becomes possible to receive the packet from the transmission source in the IPsec processing apparatus of the transmission destination without failure.

Moreover, in the present invention, unless a request message in response to a request startup message is not transmitted from the opposed IPsec processing apparatus at the time of transmission of the request startup message, since a no-response error message is transmitted to the IPsec processing apparatus of the transmission source, it becomes possible to immediately recognize non-existence of an opposed apparatus in the IPsec processing apparatus of the transmission source.

Furthermore, in the present invention, since the IKE (Internet Key Exchange: automatic key management protocol) is not used for acquisition of a common secret key, it is unnecessary to perform an arithmetic operation of Diffie-Hellman used in the IKE. Therefore, it becomes possible to reduce a time until the start of the IPsec processing compared with the conventional method requiring the arithmetic operation of Diffie-Hellman.

In the conventional method, the arithmetic operation of Diffie-Hellman is performed periodically in order to update an SA (Security Association) of the IKE, and arithmetic operation load is generated each time the arithmetic operation is performed. Since chances of updating the SA of the IKE increase when there are more parties of communication according to the IPsec, the arithmetic operation load also increases, and processing performance of the entire IPsec processing apparatus decreases.

On the other hand, in the present invention, since the arithmetic operation of Diffie-Hellman is not performed for communication other than the communication between the IPsec processing apparatuses and the IPsec setting server, it becomes possible to reduce the arithmetic operation load as well compared with the conventional method.

BRIEF DESCRIPTION OF THE DRAWINGS

FIG. 1 is a block diagram showing a structure of a network according to an IPsec in accordance with an embodiment of the present invention;

FIG. 2 is a block diagram showing a structure of an IPsec setting server of FIG. 1;

FIG. 3 is a diagram showing stored contents of a distribution policy storage section of FIG. 2;

FIG. 4 is a diagram showing stored contents of a management table of FIG. 2;

FIG. 5 is a diagram showing contents of an SA parameter of FIG. 4;

FIG. 6 is a diagram showing an example of a request message in accordance with the embodiment of the present invention;

FIG. 7 is a diagram showing an example of a distribution message in accordance with the embodiment of the present invention;

FIG. 8 is a diagram showing an example of a request startup message in accordance with the embodiment of the present invention;

FIG. 9 is a diagram showing an example of a no corresponding entry error message in accordance with the embodiment of the present invention;

FIG. 10 is a diagram showing an example of a contents inconsistent error message in accordance with the embodiment of the present invention;

FIG. 11 is a diagram showing an example of a no-response error message in accordance with the embodiment of the present invention;

FIG. 15 is a diagram showing contents of an SPD of FIG. 14;

FIG. 16 is a diagram showing an example of an application policy (z) of the SPD shown in FIG. 15;

FIG. 17 is a diagram showing contents of an SAD of FIG. 14;

FIG. 21 is a diagram showing an example of contents of an SPD of FIG. 2;

FIG. 22 is a diagram showing contents of an application policy (v) of the SPD shown in FIG. 21;

FIG. 23 is a diagram showing contents of an SPD of a conventional IPsec processing apparatus;

FIG. 24 is a diagram showing contents of an application policy (j) of the SPD of FIG. 23;

FIG. 25 is a diagram showing contents of a management table of FIG. 2 after a request message is received from an IPsec processing apparatus;

FIG. 26 is a diagram showing contents of the SPD of FIG. 14 after a distribution message is received and an application policy is set;

FIG. 27 is a diagram showing contents in the case where a new entry is generated in order to update the SA of the management table of FIG. 2;

FIG. 29 is a block diagram showing a structure of an IPsec processing apparatus in accordance with another embodiment of the present invention;

FIG. 30 is a diagram showing stored contents of a distribution policy storage section in accordance with another embodiment of the present invention;

DETAILED DESCRIPTION OF THE PREFERRED EMBODIMENTS

Figure 12:
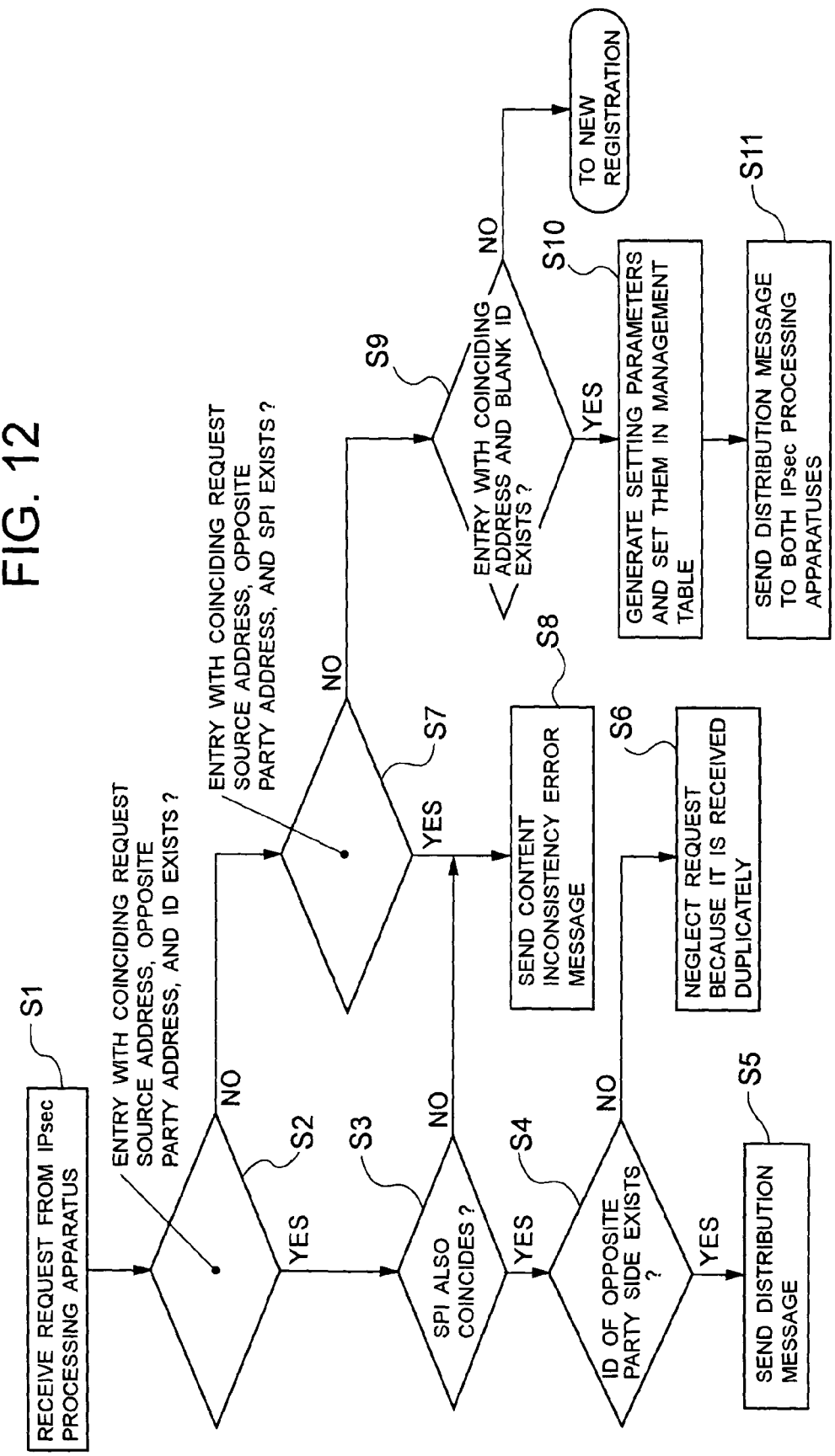
FIG. 12 is a flowchart showing operations of an IPsec setting server in accordance with the embodiment of the present invention.

Next, embodiments of the present invention will be described with reference to the accompanying drawings. FIG. 1 is a block diagram showing a structure of a network according to an IPsec (Internet Protocol security protocol) in accordance with an embodiment of the present invention. In FIG. 1, in a network in accordance with the embodiment of the present invention, a plurality of IPsec processing apparatuses 2a to 2f, which are about to carry out IPsec applied communication with each other, are connected via the Internet 100, and an IPsec setting server 1 is also connected on the Internet 100. Note that, as shown in FIG. 1, the IPsec processing apparatuses 2a to 2f may be routers switching private networks 201 to 204 with each other by communication according to the IPsec. Alternatively, the IPsec processing apparatuses 2a to 2f may be personal computers which apply the IPsec to their own communication.

FIG. 2 is a block diagram showing a structure of the IPsec setting server 1 of FIG. 1. In FIG. 2, the IPsec setting server 1 includes an interface (I/F) section 11, an IPsec processing section 12, an SPD (Security Policy Database) 13, an SAD (Security Association Database) 14, a request processing section 15, a distribution policy storage section 16, a management table 17, a random number generator 18, a timer 19, and a recording medium 20. Here, the IPsec setting server 1 is mainly constituted by a computer, and the computer executes programs stored in the recording medium 20, whereby operations of the above-described components are realized.

The interface section 11 is connected to the Internet 100 to perform data communication via the Internet 100. The IPsec processing section 12 subjects a data communication packet received from the interface section 11 to IPsec processing.

The SPD 13 is referred to from the IPsec processing section 12 and stores a policy for applying the IPsec recorded therein. The SAD 14 is referred to from the IPsec processing section 12 and stores an SA (Security Association) necessary for subjecting individual communication to the IPsec processing recorded therein.

The request processing section 15 receives a setting request message from the IPsec processing apparatuses 2a to 2f through the Interface section 11 and returns a distribution message. The distribution policy storage section 16 is referred to from the request processing section 15 and stores an IPsec policy necessary for determining a requested setting. The management table 17 is referred to and set from the request processing section 15 and stores information on respective kinds of SA communication requested to be set.

The random number generator 18 generates random numbers according to a request from the request processing section 15. The timer 19 is requested by the request processing section 15 to measure time. Among these components, the IPsec processing section 12, the SAD 14, and the SPD 13 are only necessary for the IPsec setting server 1 to protect communication with the IPsec processing apparatus 2 according to the IPsec and are identical with those in a mechanism of a conventional IPsec.

Upon receiving a data communication packet from the Internet 100, the interface section 11 transfers the data communication packet to the IPsec processing section 12 and transmits a data communication packet transferred from the IPsec processing section 12 to the Internet 100.

The IPsec processing section 12 subjects a data communication packet, to which the IPsec has been applied, received from the Internet 100 to decryption processing of the IPsec based upon the stored contents of the SAD 14 and the SPD 13, and changes the data communication packet to a state before the application of the IPsec and transfers it to the request processing section 15. In addition, the IPsec processing section 12 subjects a data communication packet received from the request processing section 15 to the IPsec processing in accordance with the stored contents of the SPD 13 and the SAD 14 and transfers the data communication packet to the interface section 11. The IPsec processing section 12 is a mechanism necessary for protecting communication between the IPsec setting server 1 and the IPsec processing apparatuses 2a to 2f and is completely the same as that in the conventional IPsec.

FIG. 3 is a diagram showing stored contents of the distribution policy storage section 16 of FIG. 2. In FIG. 3, the distribution policy storage section 16 includes an address pair column for specifying a distribution policy and a distribution policy column for setting an IPsec policy to be distributed. Parameters which can be set in the distribution policy of the distribution policy storage section 16 are an IPsec protocol, an encapsulation mode, an encryption algorithm, an authentication algorithm, and a term of validity of an SA.

In an example shown in FIG. 3, an IPsec policy, which is applied to communication between the IPsec processing apparatus 2a and the IPsec processing apparatus 2b, and an IPsec policy, which is applied to communication between the IPsec processing apparatus 2d and the IPsec processing apparatus 2e, are set. Note that a user needs to set all items in the distribution policy storage section 16 in advance. In addition, the items are not automatically rewritten during operation after the items are set once.

As the distribution policy between the IPsec processing apparatus 2a and the IPsec processing apparatus 2b, an "ESP (Encapsulating Security Payload)" is set in the IPsec protocol, a "tunnel mode" is set in the encapsulation mode, "DES-CBC (Data Encryption Standard-Cipher Block Chaining)" is set in the decryption algorithm, "HMAC (Hashing Message Authentication Code)-MD5-96" is set in the authentication algorithm, and "3600 seconds" is set in the term of validity of the SA.

In addition, as the distribution policy between the IPsec processing apparatus 2d and the IPsec processing apparatus 2e, an "ESP" is set in the IPsec protocol, a "transport mode" is set in the encapsulation mode, "3DES-CBC" is set in the decryption algorithm, "HMAC-SHA-1-96" is set in the authentication algorithm, and "3600 seconds" is set in the term of validity of the SA.

In the conventional method, it is necessary to input an identical setting individually in the respective IPsec processing apparatuses 2a to 2f for contents of an IPsec policy to be applied. However, in the method of the present invention, since an IPsec policy only has to be set in the distribution policy storage section 16 with respect to IPsec communication among the IPsec processing apparatuses 2a to 2f, an accident of making different settings in the respective IPsec processing apparatuses 2a to 2f by mistake can be avoided and, at the same time, the number of settings which the user actually inputs can also be reduced.

FIG. 4 is a diagram showing stored contents of the management table 17 of FIG. 2. In FIG. 4, the management table 17 includes a request source address column, an opposite party address column, a request ID column, and an SPI column for recording a request source address, an opposite party address, an ID, and an SPI (Security Parameter Index), which are included in a request message transmitted from the IPsec processing apparatuses 2a to 2f, respectively, and a setting parameter column for recording a parameter group which are necessary for IPsec processing for the communication. Among these columns, in the setting parameter column, SA parameters consisting of policies to be applied to the communication and parameters necessary for establishing an SA for the communication are set.

FIG. 5 is a diagram showing contents of the SA parameters of FIG. 4. In FIG. 5, the SA parameters includes an IPsec protocol, an encapsulation mode, a decryption algorithm, an authentication algorithm, a term of validity, an encryption key, an authentication key, an IV (Initialization Vector), and an SPI value to be used in the IPsec processing apparatuses 2a to 2f on the reception side of the communication.

Since requests are generated from the IPsec processing apparatuses 2a to 2f on both side communicating with each other for one IPsec communication, two request source addresses, two opposite party addresses, two request IDs, and two SPIs exist for one entry of the management table 17, respectively. In addition, even in an identical IPsec communication, a new SA may be requested in preparation for expiration of the term of validity of the SA. In this case, one entry is registered anew in the management table 17 for the new SA. Note that, since all the contents of the management table 17 are automatically set by the request processing section 15, the user does not need to set the contents of the management table 17 directly.

Since the management table 17 is referred to, setting parameters to be distributed to the IPsec processing apparatuses 2a to 2f can be obtained. Since the SA parameters in the setting parameters are decided by receiving request messages from the respective IPsec processing apparatuses 2a to 2f carrying out the IPsec communication, in the case where the request messages are received only from the IPsec processing apparatuses 2a to 2f on the one side, the request ID column and the SPI column on the opposite party side are blank, and the SA parameters in the setting parameter column are also blank. However, since the application policy is decided only by receiving request messages from the IPsec processing apparatuses 2a to 2f on the one side, a policy to be applied is set only by receiving the request messages from the IPsec processing apparatuses 2a to 2f on the one side.

In the example shown in FIG. 4, policies and SA parameters to be applied to communication between the IPsec processing apparatus 2a and the IPsec processing apparatus 2b are registered in a first entry, respectively. Policies to be applied to communication between the IPsec processing apparatus 2a and the IPsec processing apparatus 2b are also registered in a second entry. However, since a corresponding setting request message is not received from the IPsec processing apparatus 2b, SA parameters are not decided.

FIG. 5 shows contents of an SA parameter (a) in FIG. 4. The SA parameter is generated by the request processing section 15 based upon contents of a distribution policy, an SPI notified by a setting request message, and random numbers obtained from the random number generator 18.

The request processing section 15 receives request messages from the IPsec processing apparatuses 2a to 2f and transmits a request startup message, a distribution message, or an error message to the IPsec processing apparatuses 2a to 2f.

FIG. 6 is a diagram showing an example of a request message in accordance with the embodiment of the present invention. In FIG. 6, the request message includes an ID "1001" for distinguishing the request message from other request messages, a request source address "IPsec processing apparatus 2a" indicating an address of one of the IPsec processing apparatuses 2a to 2f which has transmitted the request message, the opposite party address "IPsec processing apparatus 2b" indicating an address of one of the IPsec processing apparatuses 2a to 2f to be the opposite party, and a value "5100" of an SPI used in the request source.

Note that, since the IPsec communication existing among the IPsec processing apparatuses 2a to 2f on both the sides is limited to one kind in this embodiment, if addresses of the IPsec processing apparatuses 2a to 2f on both the sides are determined, an IPsec policy to be applied can be specified uniquely. Therefore, addresses on both ends of the IPsec communication are set in a request message. In addition, it is possible that a plurality of kinds of IPsec communication are desired to be set among the two IPsec processing apparatuses 2a to 2f on both the sides. In such a case, information necessary for specifying the respective kinds of IPsec communication (e.g., a protocol number, a port number, etc.) is set in a request message.

FIG. 7 is a diagram showing an example of a distribution message in accordance with the embodiment of the present invention. FIG. 8 is a diagram showing an example of a request startup message in accordance with the embodiment of the present invention. FIG. 9 is a diagram showing an example of a no corresponding entry error message in accordance with the embodiment of the present invention. FIG. 10 is a diagram showing an example of a content inconsistency error message in accordance with the embodiment of the present invention. FIG. 11 is a diagram showing an example of a no-response error message in accordance with the embodiment of the present invention.

Figure 13:
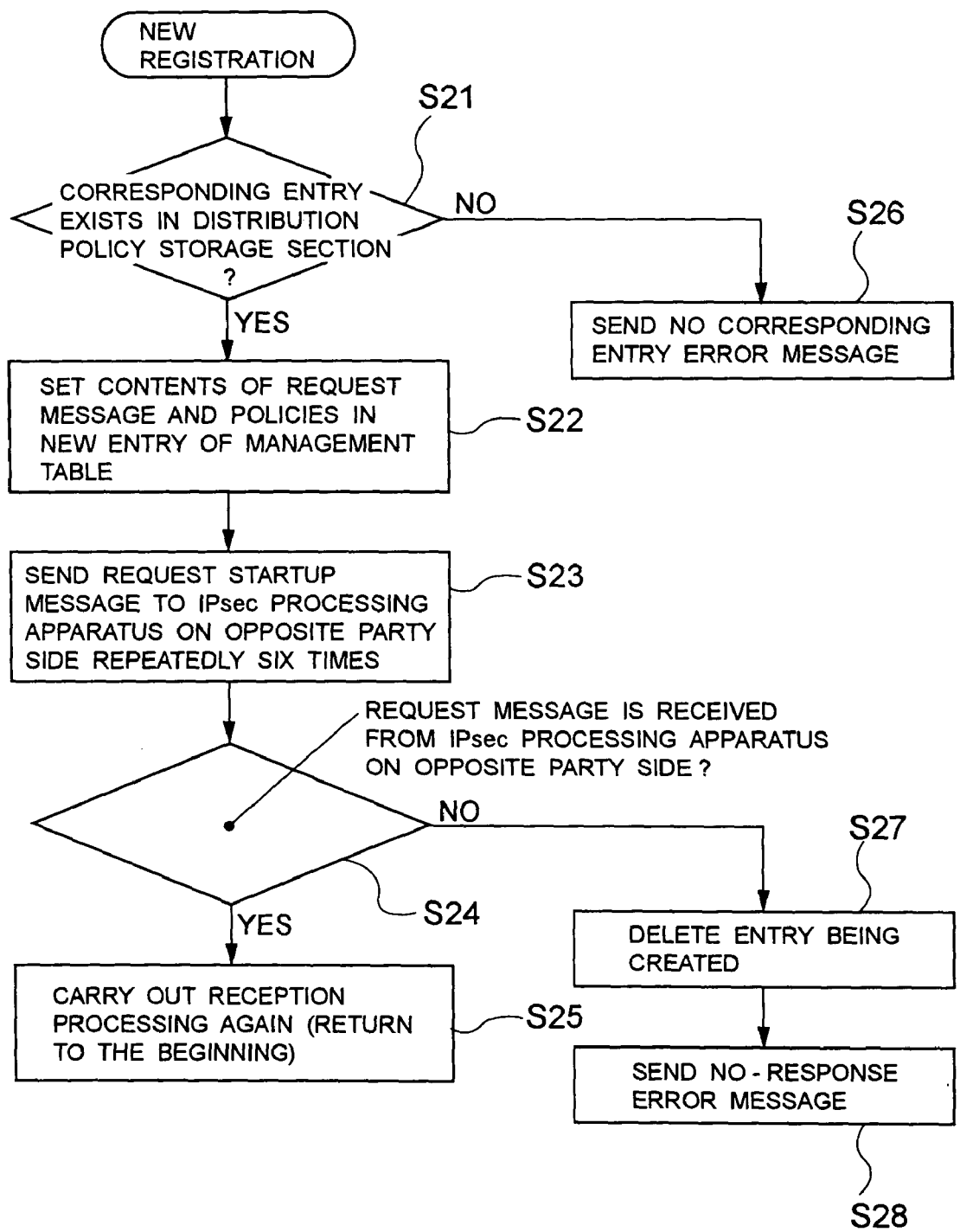
FIG. 13 is a flow chart showing operations of the IPsec setting server in accordance with the embodiment of the present invention.

FIGS. 12 and 13 are flowcharts showing operations of the IPsec setting server 1 in accordance with the embodiment of the present invention. The operations of the IPsec setting server 1 in accordance with the embodiment of the present invention will be described with reference to FIGS. 1 to 13. First, operations in the case where the request processing section 15 has received a request message will be described.

Upon receiving a request message from the IPsec processing apparatuses 2a to 2f (step S1 in FIG. 12), the request processing section 15 retrieves an entry, which coincides with a request source address, an opposite party address, and an ID included in the request message, out of the management table 17 (step S2 in FIG. 12).

When a coinciding entry is found, the request processing section 15 confirms whether an SPI of the coinciding entry coincides with an SPI included in the request message (step S3 in FIG. 12). If the SPIs do not coincide with each other, the request processing section 15 transmits a content inconsistency error message to the IPsec processing apparatuses 2a to 2f (step S8 in FIG. 12).

At this point, the ID, the request source address, and the opposite party address included in the request message, and an entry list are set in the content inconsistency error message. All entries with coinciding request source address and opposite party address among the entries included in the management table 17 are set in the entry list. However, items to be set in the entry list are only request IDs of the respective entries and SPIs for request source address used in the entries.

By receiving the content inconsistency error message, the IPsec processing apparatuses 2a to 2f can learn a difference between setting information managed by the IPsec setting server 1 and setting information grasped by the IPsec processing apparatuses 2a to 2f.

FIG. 10 shows an example of this content inconsistency error message. In FIG. 10, it is seen that setting information has already been generated by request IDs "1001" and "1002" for communication between the IPsec processing apparatus 2a and the IPsec processing apparatus 2b on the IPsec setting server 1, and values of an SPI used there is "5100" and "5110", respectively.

In the case where an entry coinciding with the request source address, the opposite party address, and the ID included in the request message is found in the management table 17 and contents of the SPI also coincide with each other, the request processing section 15 confirms a request ID column on the opposite party side of the entry in the management table 17 (step S4 in FIG. 12).

If the request ID column of the opposite party side is set, since the setting parameter column of the management table 17 has already been decided, the request processing section 15 transmits a distribution message to a transmission source of the request message (step S5 in FIG. 12). The request source address, the transmission source address, and the ID included in the request message are set in the distribution message, and the distribution policy and the SA parameters in the management table 17 are set in the setting parameter. In this case, all setting parameters which should be returned have already been decided.

FIG. 7 shows an example of this distribution message. In the example shown in FIG. 7, a distribution policy (a), and SA parameters (a) and (b) are set in the setting parameters. The IPsec processing apparatus 2a can carry out IPsec communication in both directions using the distribution policy (a) and the SA parameters (a) and (b).

In the case where an entry coinciding with the request source address, the opposite party address, and the ID included in the request message are found in the management table 17 and contents of the SPIs also coincide with each other, but the request ID column on the opposite party side is not set, the request processing section 15 ends the processing as it is (step S6 in FIG. 12). In this case, although the request processing section 15 has already received identical request messages from the IPsec processing apparatuses 2a to 2f, since there is no information on the opposite party side, the request processing section 15 is waiting for information on the opposite party side.

In the case where there is no entry with coinciding request source address, opposite party address, and ID in the management table 17, the request processing section 15 retrieves the management table 17 with the request source address, the opposite party address, and the SPI included in the request message as keys (step S7 in FIG. 12).

When a coinciding entry is found, the request processing section 15 transmits a content inconsistency error message to the transmission source of the request message and ends the processing (step S8 of FIG. 12). This is the case where the IPsec processing apparatuses 2a to 2f have requested new setting parameters duplicately using the SPI already registered in the IPsec setting server 1. By receiving the content inconsistency error message, the IPsec processing apparatuses 2a to 2f can detect duplication of the SPI and select an SPI not duplicating.

If there is no entry with coinciding request source address, opposite party address, and ID in the management table 17 and duplication of an SPI is not detected either, the request processing section 15 retrieves the management table 17 with the request source address and the opposite party address included in the request message as keys (step S9 in FIG. 12). At this point, the request processing section 15 retrieves an entry in which the request ID column is blank.

If a coinciding entry exists, a request message for the communication has already been transmitted from the IPsec processing apparatuses 2a to 2f of the opposite party side, and even an application policy of setting parameters is decided. The request processing section 15 sets an ID and an SPI, which are set in the request message, in the blank request ID column and SPI column, respectively, and generates SA parameters for the respective directions in accordance with policies indicated by the application policy in the setting parameter column.

More specifically, the request processing section 15 sets contents identical with the application policy for the IPsec protocol, the encapsulation mode, the decryption algorithm, the authentication algorithm, the term of validity, obtains random numbers from the random number generator 18 to determine values for the decryption key, the authentication key, and the IV, and sets a value of an SPI to be used by the IPsec processing apparatuses 2a to 2f on the reception side in the reception side SPI column.

When the SA parameters for the respective directions can be generated, the request processing section 15 registers the SA parameters in the setting parameter column of the managing table 17 (step S10 of FIG. 12). When the SA parameters are registered in the management table 17, the request processing section 15 transmits a distribution message, in which a request ID and setting parameters of the transmission source of the request message, the IPsec processing apparatuses 2a to 2f, are set, to the IPsec processing apparatuses 2a to 2f and, at the same time, also transmits a distribution message including a request ID of the opposite party to the IPsec processing apparatuses 2a to 2f to be the opposite party (step S11 in FIG. 12).

In addition, the request processing section 15 uses the timer 19 to measure time same as the term of validity of the SA parameters and, at the point when the time measured by the timer 19 has been a predetermined value, deletes the entry of the management table 17.

In the case where there is no entry with coinciding request source address and request ID in the management table 17 and a coinciding entry is not found even by the retrieval with the request source address and the opposite party address as keys, the request processing section 15 retrieves the distribution policy storage section 16 with a pair of the request source address and the opposite party address included in the request message as a key (step S21 in FIG. 13).

If a corresponding entry is not found, the request processing section 15 transmits a no corresponding entry error message to the IPsec processing apparatuses 2a to 2f (step S26 in FIG. 13). The request processing section 15 sets the ID, the request source address, and the opposite party address included in the request message in the no corresponding entry error message. FIG. 9 shows an example of this no corresponding entry error message.

In the case where a coinciding entry exists in the distribution policy storage section 16, the request processing section 15 sets the request source address, the opposite party address, the ID, and the SPI included in the request message in an request source address column, an opposite party address column, a request ID column and an SPI column of a new entry of the management table 17, respectively. The request processing section 15 sets the opposite party address of the request message and the request source address of the request message in another request source address column and the opposite party address column in the identical entry respectively, and leaves the request ID column and the SPI column blank.

In addition, the request processing section 15 sets the distribution policy included in the entry of the distribution policy storage section 16 in the setting parameter column of the management table 17 (step S22 in FIG. 13). At this point, all parameters other than a common secret key such as an encryption key or an authentication key, and SPIs to be used in the opposite party IPsec processing apparatuses 2a to 2f among a parameter group necessary for generating SA parameters are decided. Since the common secret key uses random numbers obtained from the random number generator 19, if only an SPI of the opposite party is decided, it becomes possible to generate the SA parameters.

If a coinciding entry exists in the distribution policy storage section 16, after registering the entry in the management table 17 in response to a request from the IPsec processing apparatuses 2a to 2f of the request source, the request processing section 15 transmits a request startup message to the IPsec processing apparatuses 2a to 2f of the opposite party (step S23 in FIG. 13). The request processing section 15 sets the request source address of the request message in the request startup message. FIG. 8 shows an example of this request startup message.

After transmitting the request startup message, the request processing section 15 repeats transmission of the request startup message at an interval of five seconds and, upon receiving a request message corresponding to the entry of the management table 17 from the IPsec processing apparatuses 2a to 2f of the transmission destination of the request startup message or transmitting the request startup message for six times, stops the transmission of the request startup message. By transmitting the request startup message repeatedly, the request processing section 15 can continue the processing with another request startup message even in the case where one request startup message is lost.

If the request processing section 15 has stopped the transmission by transmitting the request startup message for six times (step S24 in FIG. 13), the request processing section 15 deletes the entry from the management table 17 (step S27 in FIG. 13) and transmits a no-response error message to the IPsec processing apparatuses 2a to 2f of the transmission source of the request message (step S28 in FIG. 13). The request processing section 15 sets the ID, the request source address, and the opposite party address, which are included in the request message from the IPsec processing apparatuses 2a to 2f, in the no-response error message. FIG. 11 shows an example of this no-response error message.

Upon receiving the request message corresponding to the entry of the management table 17 in response to the request startup message (step S24 in FIG. 13), the request processing section 15 stops the transmission of the request startup message and performs the operations at the time of receiving the request message (step S25 in FIG. 13).

The timer 19 is requested by the request processing section 15 to measure a time and, when a designated time has elapsed, informs the request processing section 15 to that effect. The timer 19 can measure a plurality of times simultaneously.

As described above, since a request startup message is transmitted, in an IPsec processing apparatus opposed to an IPsec processing apparatus of a transmission source of a request message, setting of a policy of the IPsec is performed substantially simultaneously with setting of a policy of the IPsec in the IPsec processing apparatus of the transmission source. If the IPsec processing apparatus of the transmission source encrypts and transmits a packet after setting the policy, the opposed IPsec processing apparatus can decrypt and receive the packet from the IPsec processing apparatus of the transmission source. Thus, encryption and decryption after setting a policy can be performed without delay.

In this case, since a packet is not cancelled due to inability to decrypt the packet or decryption of a packet is never performed by mistake, an IPsec processing apparatus of a transmission destination can receive the packet from the transmission source without failure.

In addition, if the request message in response to the request startup message is not received from the opposed IPsec processing apparatus at the time of transmission of the request startup message, since a no-response error message is transmitted to the IPsec processing apparatus of the transmission source, the IPsec processing apparatus of the transmission source can immediately recognize nonexistence of an opposed apparatus.

Figure 14:
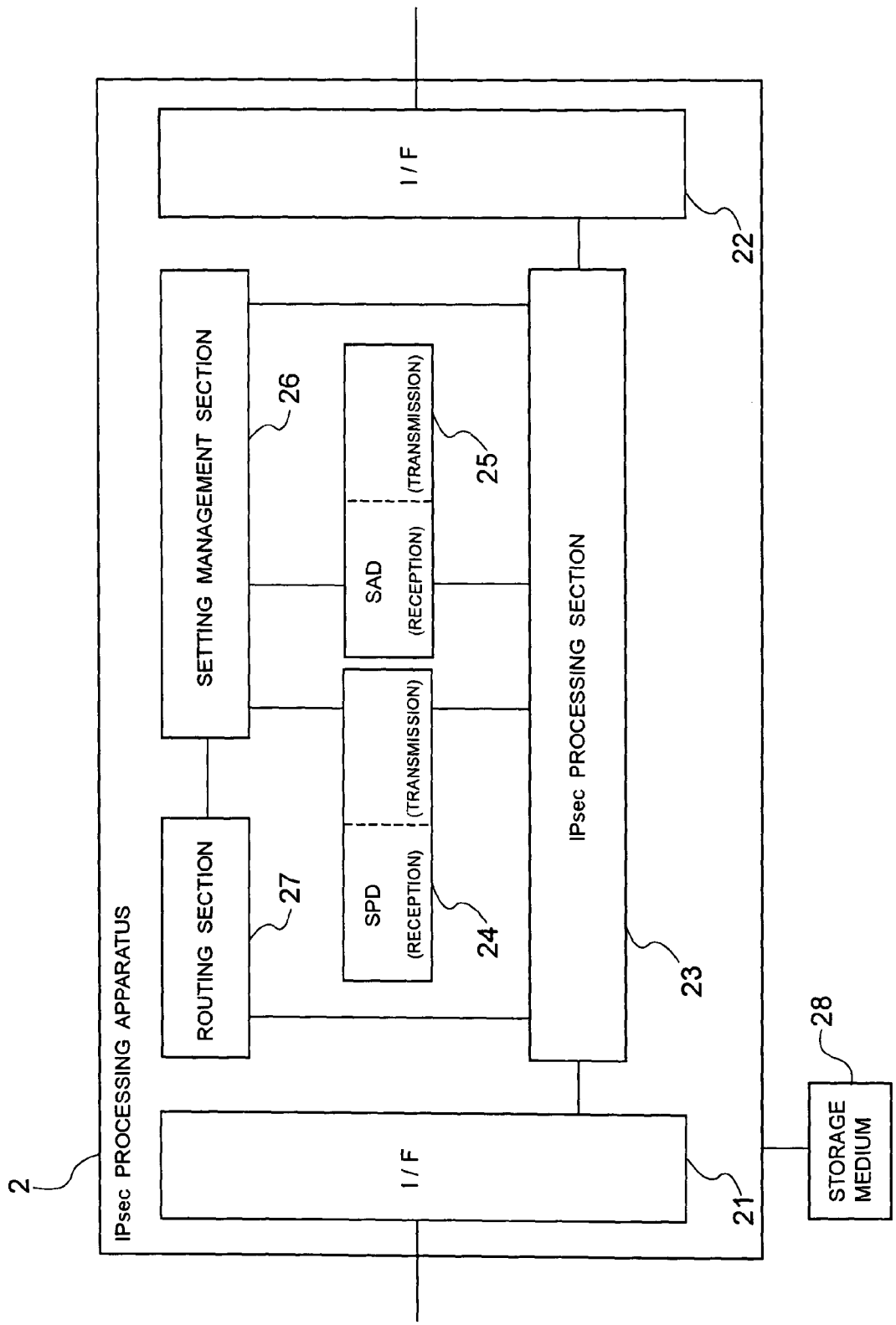
FIG. 14 is a block diagram showing a structure of an IPsec processing apparatus of FIG. 1.

FIG. 14 is a block diagram showing a structure of the IPsec processing apparatuses 2a to 2f of FIG. 1. In FIG. 14, the IPsec processing apparatuses 2a to 2f are collectively illustrated as an IPsec processing apparatus 2, and the IPsec processing apparatuses 2a to 2f have the same structure as the IPsec processing apparatus 2.

The IPsec processing apparatus 2 is mainly constituted by a computer and uses an IPsec setting server 1. That is, the IPsec processing apparatus 2 includes interface sections (I/Fs) 21 and 22, an IPsec processing section 23, an SPD 24, an SAD 25, a setting management section 26, a routing section 27, and a recording medium 28. The computer executes programs of the recording medium 28, whereby operations of the above-described respective components are realized.

The interface section 21 is connected to a private network 200 (any one of private networks 201 to 204 of FIG. 1) to perform data communication with the private network 200. The interface section 22 is connected to the Internet 100 to perform data communication via the Internet 100.

The IPsec processing section 23 subjects a data communication packet received from the interface sections 21 and 22 to IPsec processing. The setting management section 26 is requested by the IPsec processing section 23 to request the IPsec setting server 1 to perform necessary setting.

The SPD 24 is referred to from the IPsec processing section 23 and the setting management section 26 and has a policy for applying the IPsec recorded therein. The SAD 25 is referred to from the IPsec processing section 23 and the setting management section 26 and has an SA, which is necessary for subjecting individual communication to the IPsec processing, recorded therein. The routing section 27 transmits and receives data communication packets to and from the IPsec processing section 23 and the setting management section 26 and determines transfer destinations of the respective data communication packets.

Figure 31:
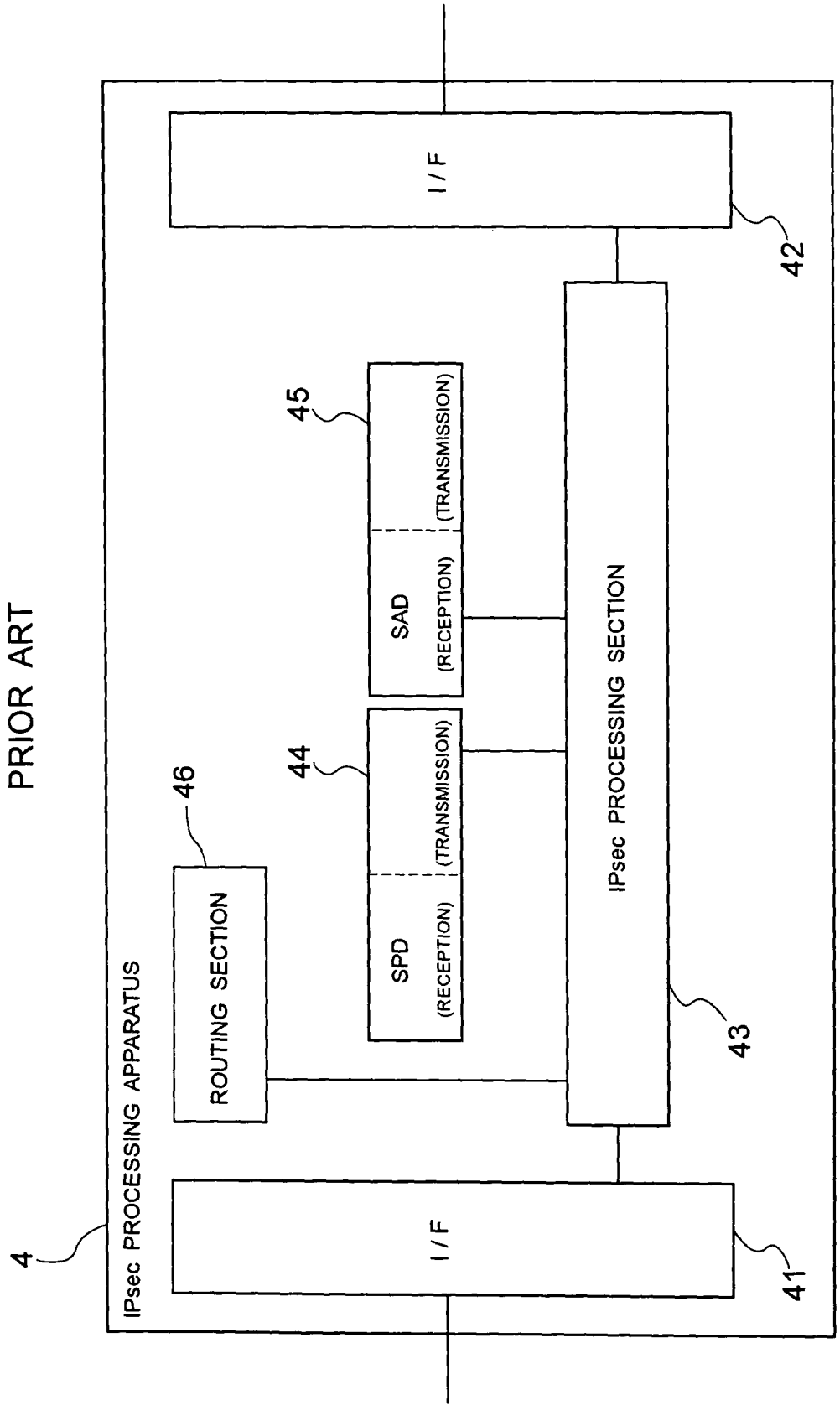
FIG. 31 is a block diagram showing a structure of a conventional IPsec processing apparatus.

A structure of the IPsec processing apparatus 2 is different from the structure of the conventional IPsec processing apparatus shown in FIG. 31 in that the setting management section 26 is added. In addition, as described later, the structure of the IPsec processing apparatus 2 is different in that new items are added in the SPD 24 and that new operations are added to the IPsec processing section 23.

The interface section 21 receives a data communication packet from the private network 200 and transfers it to the IPsec processing section 23, and transmits a data communication packet transferred from the IPsec processing section 23 to the private network 200.

The interface section 22 receives a data communication packet from the Internet 100 and transfers it to the IPsec processing section 23, and transmits a data communication packet transferred from the IPsec processing section 23 to the Internet 100.

The SPD 24 includes an ID column for identifying an individual SPD entry and clarifying a priority, a selector column for selecting a traffic, a processing column for a selected traffic, an IPsec application policy column for recording parameter information or the like of the IPsec in the case where IPsec processing is applied, and the opposite party address for setting request column for judging whether or not to request the IPsec setting server 1 to perform setting at the time of SPD retrieval.

FIG. 15 is a diagram showing contents of the SPD 24 of FIG. 14. In FIG. 15, the SPD 24 is identical with an SPD used in an ordinary IPsec except that the opposite party address for setting request column is added. Note that the SPD 24 includes an SPD for transmission and an SPD for reception.

In the case where the IPsec processing section 23 has received a data communication packet, the SPD 24 is used for determining treatment of the packet. Upon receiving a data communication packet to which the IPsec is not applied, the IPsec processing section 23 compares it with the selector column of the SPD 24 to retrieve a coinciding entry. When the coinciding entry is found, the IPsec processing section 23 determines treatment of the packet in accordance with the processing column.

Any one of "IPsec application", "passage", and "disposal" is stored in the processing column. In particular, in the case where processing of "IPsec application" is to be performed, the processing of the IPsec is performed continuously in accordance with contents of the IPsec policy column.

In this embodiment, in the opposite party address column existing in the SPD 24, if the processing column is "IPsec application", the IPsec application policy column is used for judging whether or not to request the IPsec setting server 1 to perform setting and, at the same time, is used as an identifier for specifying setting parameters to be requested in the case where the IPsec setting server 1 is requested to perform setting.

Note that, as in the standard IPsec, basically, it is necessary to set all the contents of the SPD 24 in advance. However, it is possible to omit an IPsec application policy for an entry in which the opposite party address for setting request is set. In this case, the setting management section 26 acquires necessary IPsec application policy information from the IPsec setting server 1 and automatically sets the IPsec application policy column of the SPD 24. At this point, the application policy cannot be omitted only for setting for encrypting communication with the IPsec setting server 1.

In the example shown in FIG. 15, setting is made such that a packet from the IPsec processing apparatus 2a itself to the IPsec setting server 1 is subjected to the IPsec processing in accordance with an application policy (z), a packet directed to the private network 202 and a packet directed to the private network 203 are subjected to the IPsec processing and a policy therefor is acquired from the IPsec setting server 1, and all the other packets are not subjected to the IPsec processing but is passed.

FIG. 16 is a diagram showing an example of the application policy (z) of the SPD 24 shown in FIG. 15. In FIG. 16, information necessary for specifying the IPsec processing to be applied such as a protocol, an encapsulation mode, an encryption algorithm, and an authentication algorithm, which are used in IPsec communication, is set in the IPsec application policy.

In the example shown in FIG. 16, it is indicated that "AES-CBC" is used for the encryption algorithm and "HMAC-SHA-1-96" is used for the authentication algorithm, a "transport mode" of ESP is applied, and a term of validity of an SA is "3600 seconds". Note that, since parameters to be required are different depending upon a protocol, an encryption algorithm, or the like to be used, parameters other than the parameters shown in FIG. 16 may appear or a part of the parameters in FIG. 16 may not exist in respective application policies.

In the conventional IPsec, a user needs to set all the application policies in the IPsec processing apparatus in advance. However, as described in the preceding section, it is possible to omit setting of the application policies in the SPD 24 of this embodiment. In that case, the IPsec application policy acquired from the IPsec setting server 1 is automatically set by the setting management section 26.

Note that, in the case where the IKE is used, parameters required for the IKE itself exist independently from the IPsec application policy of the SPD 24. However, from the viewpoint of this embodiment, these parameters are equivalent to the IPsec application policy in that these are originally parameters which the user should set and can be omitted by using the IPsec setting server 1 of this embodiment. Thus, for ease of explanation, in the case where the IPsec application policy of the SPD 24 is a policy using the IKE, the policy is treated assuming that all the parameters for the IKE are also included in the policy. Therefore, in the example shown in FIG. 16, setting parameters for the IKE are also included in the policy. In an actual structure, setting of the IKE itself is still independent from the IPsec application policy.

FIG. 17 is a diagram showing contents of the SAD 25 of FIG. 14. In FIG. 17, an SA required for individual IPsec communication is registered in the SAD 25. That is, the SAD 25 is a database for managing the SA.

In the IPsec application policy of the SPD 24, information for indicating IPsec processing to be applied (what kind of IPsec processing is applied) is shown. However, additional information is required for actually performing the IPsec processing.

For example, in the case where the IKE is used, IPsec processing can be carried out once only when an encryption key and an authentication key used in the IPsec processing are exchanged with an IPsec processing apparatus of the opposite party and values of the keys are used. In this way, a parameter group necessary for carrying out the IPsec processing once is called an SA.

The SAD 25 includes an ID for identifying an individual SAD entry, a terminal address indicating the opposite party address of IPsec communication, an IPsec protocol to be used in the IPsec communication, an SPI which is an identifier peculiar to an individual SA, and other SA parameters.

Since the SAD 25 is automatically set by the setting management section 26 or the IPsec processing section 23, a user does not need to set the SAD 25 directly. Note that the SAD 25 is identical with an SAD used in a standard IPsec and includes an SAD for transmission and an SAD for reception.

In the example shown in FIG. 17, an SA between the IPsec processing apparatus 2a and the IPsec processing apparatus 2b is registered in a first entry and an SA between the IPsec processing apparatus 2a and the IPsec setting server 1 is registered in a second entry.

Figure 18:
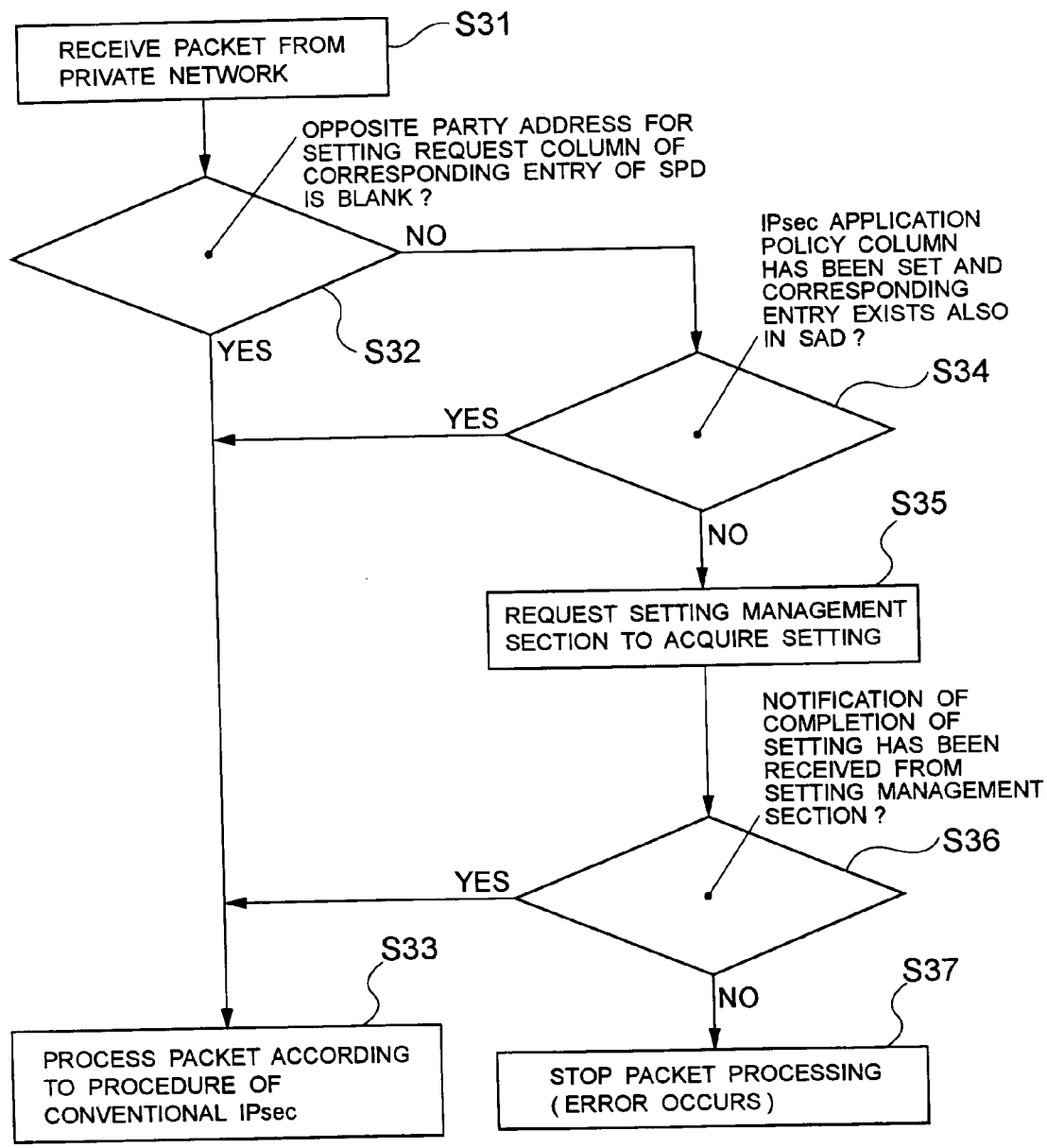
FIG. 18 is a flowchart showing processing operations of an IPsec processing section of FIG. 14.
Figure 19:
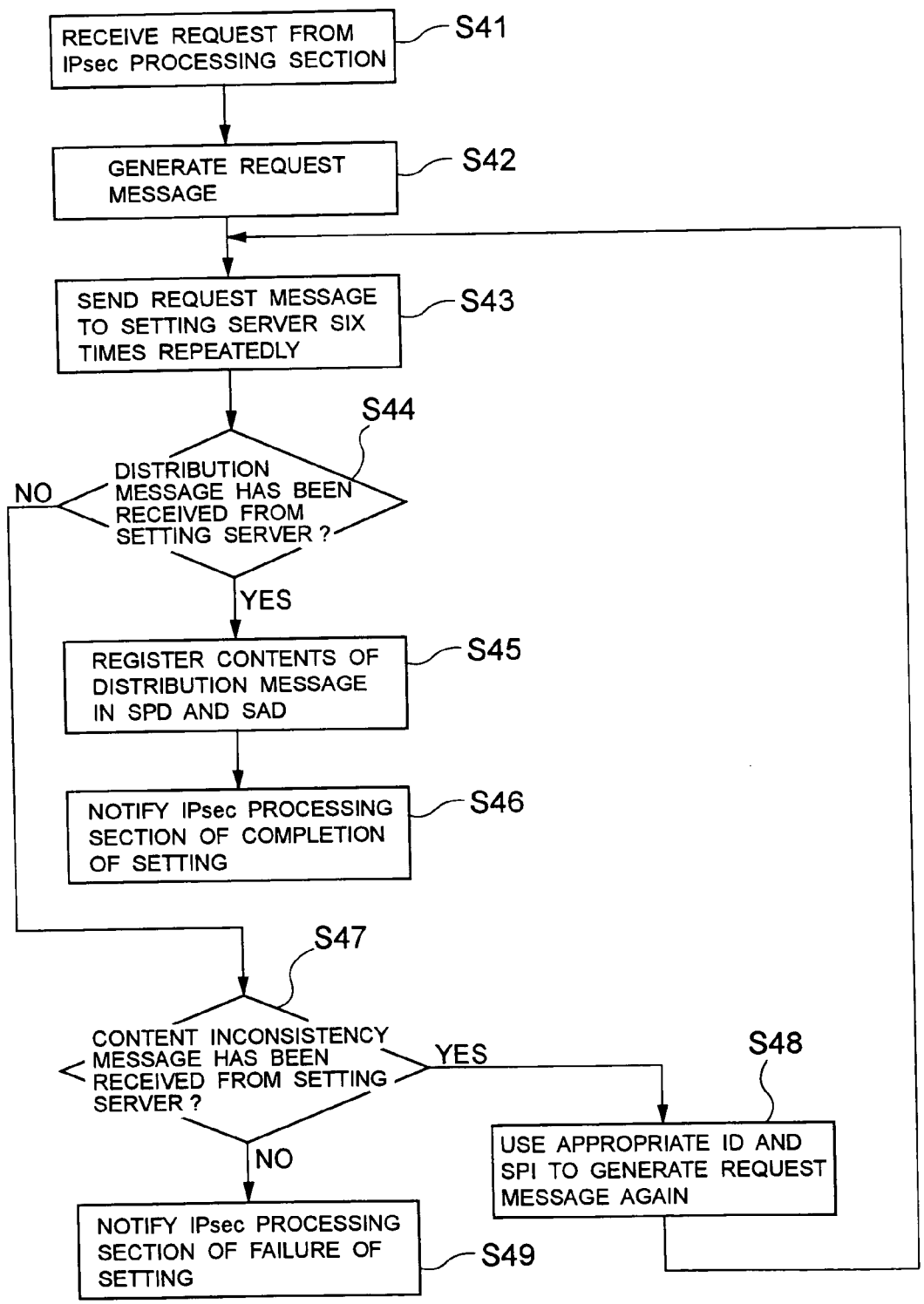
FIG. 19 is a flowchart showing processing operations of a setting management section of FIG. 14.
Figure 20:
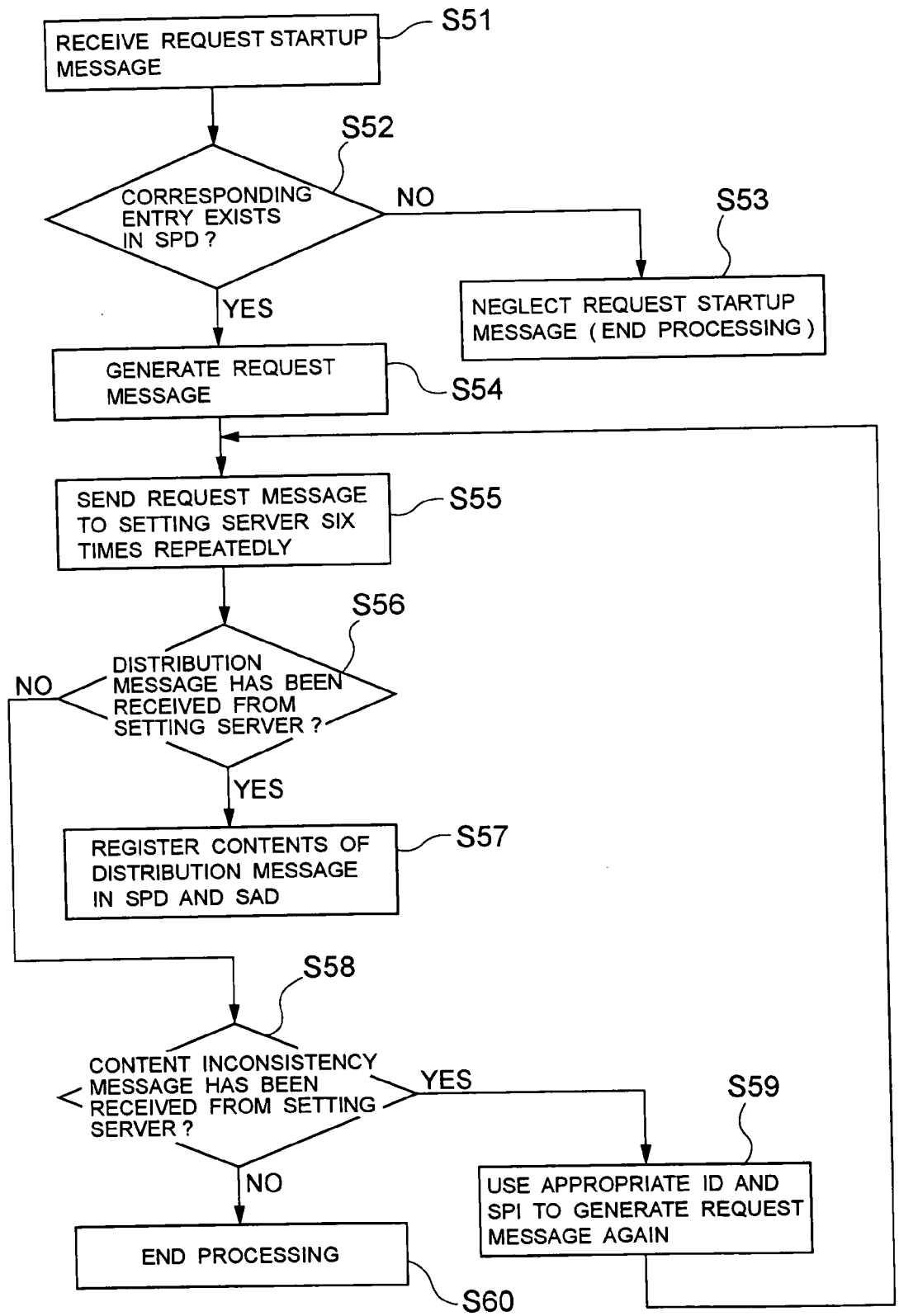
FIG. 20 is a flowchart showing processing operations of the setting management section of FIG. 14.

FIG. 18 is a flowchart showing processing operations of the IPsec processing section 23 of FIG. 14. FIGS. 19 and 20 are flowcharts showing processing operations of the setting management section 26 of FIG. 14. Operations of the IPsec processing apparatuses 2a to 2f will be described with reference to FIGS. 18 to 20.

Upon receiving a data communication packet directed to the Internet 100 from the private network 200 (step S31 in FIG. 18), the IPsec processing section 23 compares the data communication packet and the selector column of the SPD 24 to retrieve a corresponding entry (step S32 in FIG. 18). If the opposite party address for setting request column of the corresponding entry is blank, operations of the IPsec processing section 23 are identical with those of the conventional IPsec (step S33 in FIG. 18).

Note that, according to the operations of the conventional IPsec, transmission and reception of a message between the IPsec processing apparatus 2 and the IPsec setting server 1 are protected. That is, communication between the IPsec processing apparatus 2 and the IPsec setting server 1 is registered in the SPD 24 in advance in accordance with the ordinary method of the IPsec.

In the case where it is found by the retrieval of the SPD 24 that the opposite party address for setting request column of the corresponding entry is set, and the IPsec application policy column is set, the IPsec processing section 23 further retrieves an SA for the communication from the SAD 25 (step S34 in FIG. 18). If the SA for the communication exists, the operations of the IPsec processing section 23 are identical with those of the conventional IPsec, and the IPsec processing section 23 subjects the data communication packet to the IPsec processing in accordance with contents of the SA (step S33 in FIG. 18).

In the case where it is found by the retrieval of the SPD 24 that the opposite party address for setting request column of the corresponding entry is set and the IPsec application policy column is also set, and in the case where a corresponding entry does not exist in the SAD 25 or in the case where the IPsec application policy column is not set in the first place, the IPsec processing section 23 suspends the processing of the data communication packet and requests the setting management section 26 to acquire a setting from a setting server (step S35 in FIG. 18). At this point, the IPsec processing section 23 notifies the setting management section 26 of an ID of the entry of the SPD 24.

After requesting the setting management section 26 to acquire a setting form the setting server, the IPsec processing section 23 does not make a request for the identical SPD entry until a result is notified from the setting management section 26. If the IPsec processing management section has received a notification of completion of setting from the setting management section 26 (step S36 in FIG. 18), the IPsec processing section 23 resumes the IPsec processing of the data communication packet (step S33 in FIG. 18). At this point, the necessary policy and SA are set by the setting management section 26, and IPsec processing as conventionally done is only carries out.

Upon receiving a notification of failure of setting from the setting management section 26 (step S33 of FIG. 18), the IPsec processing section 23 stops the data communication packet processing which has been suspended (step S37 in FIG. 18).

In the case where a data communication packet, to which the IPsec has been applied, directed to the private network 200 is received from the Internet 100, the IPsec processing section 23 operates in the same manner as the conventional IPsec. That is, the IPsec processing section 23 retrieves a corresponding entry from the SAD 24 and, if a coinciding entry exists, carries out decryption processing of the IPsec in accordance with contents of the entry. If a coinciding entry does not exist, the IPsec processing section 23 disposes of the data communication packet.

The IPsec processing section 23 confirms a term of validity of each SA entry in the SAD 25 and establishes a new SA before the term of validity expires in the same manner as the conventional IPsec. At this point, in the case where the SA is an SA generated by the IPsec setting server 1, the IPsec processing section 23 requests the setting management section 26 to acquire a setting from the IPsec setting server 1.

In requesting acquisition of a setting, the IPsec processing section 23 notifies the setting management section 26 of an ID of an entry of the SPD 24 corresponding to the SA. Although a result in response to the request is notified from the setting management section 26, the IPsec processing section 23 neglects the notification of the result.

Upon receiving a request for acquisition of a setting from the IPsec processing section 23 (step S41 in FIG. 19), the setting management section 26 generates a request message for the notified entry of the SPD 24 (step S42 in FIG. 19). The setting management section 26 sets an ID, a request source address, an opposite party address, and a value of an SPI used in the request source in the request message. The setting management section 26 sets an arbitrary numerical value, which does not duplicate with other request messages, in the ID, and sets an SPI, which the setting management section 26 itself intends to use in the IPsec communication, in the SPI. The setting management section 26 sets an address of the IPsec processing apparatus 2 in the request source address. The setting management section 26 sets the opposite party for setting request address, which is included in the entry of the SPD 24, in the opposite party address.

Since the ID, the request source address, and the opposite party address set in the message transmitted by the setting management section 26 are included in a reply message from the IPsec setting server 1, the setting management section 26 can distinguish which message is responded to.

FIG. 6 shows an example of this request message. The example shown in FIG. 6 is an example of a message with which the IPsec processing apparatus 2a requests a setting necessary for the IPsec communication with the IPsec processing apparatus 2b.

The setting management section 26 transmits a generated request message to the IPsec setting server 1 (step S43 in FIG. 19). After sending the request message to the IPsec setting server 1, the setting management section 26 repeats transmission of the request message at an interval of 5 seconds and, upon receiving a response to the request message from the IPsec setting server 1 or sending the request message six times, stops the transmission of the request message.

If the setting management section 26 has stopped transmission by sending the request message six times or has received a no corresponding entry error message or a no-response error message (steps S44 and S47 in FIG. 19), the setting management section 26 notifies the IPsec processing section 23 of failure of the setting to end the processing (step S49 in FIG. 19).

Note that, in repeating transmission of the request message, the setting management section 26 transmits the request message always using the same ID and the same SPI. By transmitting the request message repeatedly, the setting management section 26 can continue the processing with another request message even in the case where one request message is lost.

If the setting management section 26 has received a content inconsistency error message from the IPsec setting server 1 (step S47 in FIG. 19), the setting management section 26 confirms an entry list included in the content inconsistency error message, selects an ID and an SPI again using values other than an ID and an SPI included in the entry list, and transmits a request message to the IPsec setting server 1 (step S48 in FIG. 19).

This is the case where the IPsec processing transmits a request message using an ID or an SPI registered on the IPsec setting server 1 side after losing operation information due to some reason.

The setting management section 26 can generate a new request message, which is consistent with existing information of the IPsec setting server 1, by using values other than the ID and the SPI notified by the content inconsistency error message.

If the setting management section 26 has received a distribution message from the IPsec setting server 1 (step S44 in FIG. 19), the setting management section 26 sets an application policy included in the distribution message in the IPsec application policy column of the SPD 24, and generates an SA using SA parameters included in the distribution message and registers it in the SAD 25 (step S45 in FIG. 19). After registering the SA in the SAD 25, the setting management section 26 notifies the IPsec processing section 23 of completion of the setting and ends the processing (step S46 in FIG. 19).

Upon receiving a request startup message from the IPsec setting server 1 (step S51 in FIG. 20), the setting management section 26 retrieves an entry with an opposite party address for setting request coinciding with an opposite party address included in the request startup message out of entries of the SPD 24 (step S52 in FIG. 20). If a coinciding entry is not found, the setting management section 26 neglects the request startup message (step S53 in FIG. 20).

In this case, the request startup message is transmitted from the IPsec setting server 1 six times. Thereafter, the IPsec setting server 1 stops the transmission of the request startup message, and an error message is transmitted to the IPsec processing apparatus 2, which has transmitted the request message originally, from the IPsec setting server 1.

If a coinciding entry is found by the retrieval of the SPD 24, the setting management section 26 operates in the same manner as at the time when the setting management section 26 received the setting acquisition request for the entry of the SPD 24 from the IPsec processing section 23. That is, the setting management section 26 generates a request message and transmits it to the IPsec setting server 1 repeatedly up to six times (steps S54 and S55 in FIG. 20).

However, since this is not transmission according to a request of the IPsec processing section 23, even if a distribution message or an error message is received from the IPsec setting server 1, the setting management section 26 does not notify the IPsec processing section 23 of the result (steps S56, S58, and S60 in FIG. 20).

In addition, in the casewhere the setting management section 23 starts transmission of a request message in response to the request startup message, the setting management section 23 does not transmit a new request message until the repeated transmission stops even if a request startup message for the identical entry of the SPD 24 is received.

On the other hand, if the setting management section 26 has received a distribution message from the IPsec setting server 1 (step S56 in FIG. 20), the setting management section 26 sets an application policy included in the distribution message in the IPsec application policy column of the SPD 24, and generates an SA using SA parameters included in the distribution message and registers it in the SAD 25 (step S57 in FIG. 20).

The routing section 27 receives a data communication packet subjected to the IPsec decryption processing from the IPsec processing section 23 and, in the case where the packet is a packet directed to the setting management section 26, transfers the packet to the setting management section 26. In the case where the packet is not a packet directed to the setting management section 26, the routing section 27 determines an interface to which the packet should be transmitted and transfers the packet to the interface via the IPsec processing section 23 again.

In addition, the routing section 27 receives a data communication packet from the setting management section 26, determines an interface to which the packet should be transmitted, and transfers the packet via the IPsec processing section 23.

FIG. 21 is a diagram showing an example of contents of the SPD 13 of FIG. 2. FIG. 22 is a diagram showing contents of an application policy (v) of the SPD 13 shown in FIG. 21. FIG. 23 is a diagram showing contents of an SPD of the conventional IPsec processing apparatus. FIG. 24 is a diagram showing contents of an application policy (j) of the SPD of FIG. 23.

Figure 28:
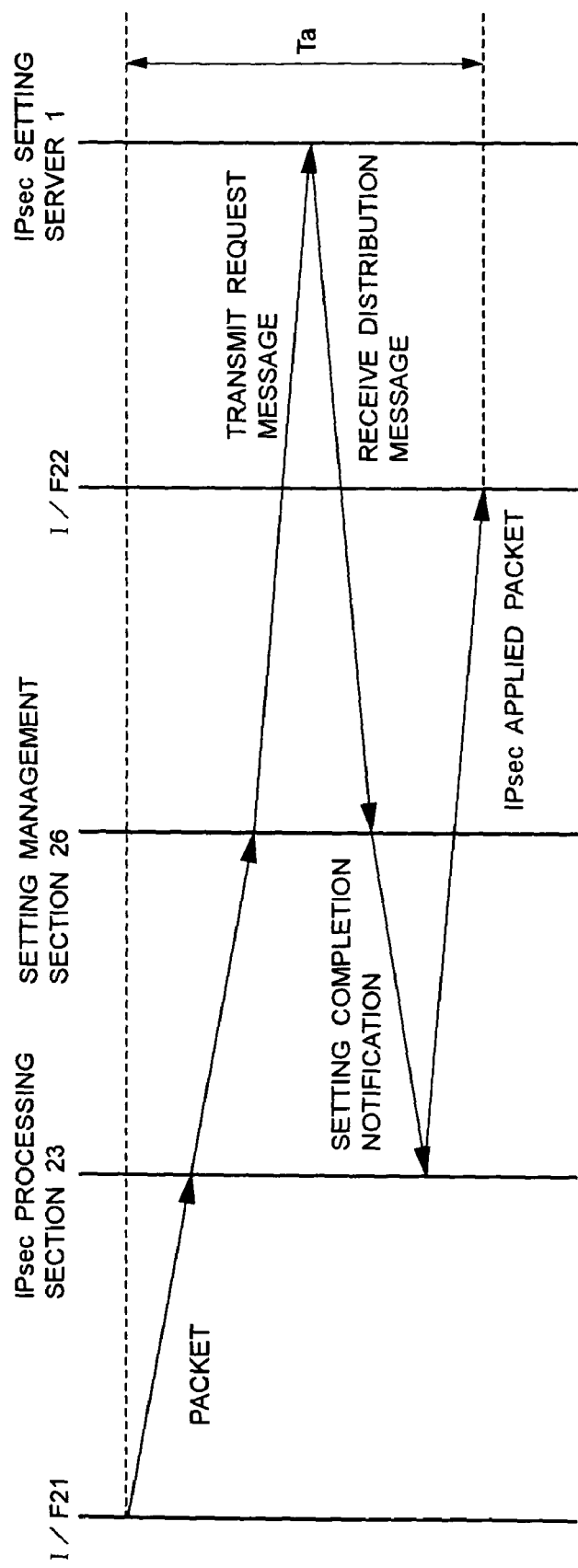
FIG. 28 is a sequence chart showing operations of the IPsec processing apparatus in accordance with the embodiment of the present invention.

In addition, FIG. 25 is a diagram showing contents of the management table 17 of FIG. 2 after a request message is received from the IPsec processing apparatus 2*a*. FIG. 26 is a diagram showing contents of the SPD 24 of FIG. 14 after a setting message is received and an application policy is set. FIG. 27 is a diagram showing contents of the management table 17 of FIG. 2 in the case where a new entry is generated in order to update an SA. FIG. 28 is a sequence chart showing operations of the IPsec processing apparatus 2 in accordance with the embodiment of the present invention.

Specific operations of the IPsec setting server 1 of this embodiment will be described with reference to FIGS. 1 to 28. Here, taking notice of the IPsec processing apparatus 2*a* in FIG. 1, a case will be described in which the IPsec processing apparatus 2*a* subjects data communication from the private network 201 to the private network 202 to the IPsec processing. First, items required to be set in the IPsec setting server 1, the IPsec processing apparatus 2*a*, and the IPsec processing apparatus 2*b* in advance will be described.

In the IPsec setting server 1, in order to secure safe paths of the IPsec between the IPsec setting server 1 and the IPsec processing apparatuses 2*a* and 2*b*, respectively, an SPD 13 is set with the same method as in the past. As shown in FIG. 21, the SPD 13 is set such that the IPsec is applied to communication from the IPsec setting server 1 itself to the IPsec processing apparatuses 2*a* and 2*b* in accordance with an application policy (v) and an application policy (w), respectively.

FIG. 22 shows contents of this application policy (v). In the application policy (v), policies for encrypting communication with the IPsec processing apparatus 2*a* are set. In addition, parameters for the IKE are also set in order to carry out key exchange by the IKE in the IPsec communication with the IPsec processing apparatus 2*a*.

Note that, although settings for the IKE essentially exist independently form the IPsec application policy, for ease of explanation, the settings are treated as a part of the application policy in the description of this embodiment. Contents of the application policy (w) are the same as those of the application policy (v).

The safe path of the IPsec is set between the IPsec setting server 1 and the IPsec processing apparatus 2*a* by these settings, and distribution of setting information and a secret key can be performed safely.

In the SPD 13, it is necessary to perform setting for all the IPsec processing apparatuses 2 communicating with the IPsec setting server 1 one by one. For example, in the example shown in FIG. 21, policies for the IPsec processing apparatuses 2d and 2e are also set in addition to the policies for the IPsec processing apparatuses 2a and 2b.

Subsequently, in the IPsec setting server 1, policies of the IPsec to be applied between the IPsec processing apparatus 2a and the IPsec processing apparatus 2b are set in the distribution policy storage section 16. FIG. 3 shows an example of the distribution policy storage section 16. Addresses of the IPsec processing apparatuses 2a and 2b are set in an address pair column of the distribution policy storage section 16, and policies to be applied to the communication are set in a distribution policy column thereof.

An IPsec protocol, an encapsulation mode, an encryption algorithm, an authentication algorithm, and a term of validity of an SA to be used are set in the policies. In addition, since the IPsec setting server 1 distributes a common secret key to the respective IPsec processing apparatuses 2a to 2f, the IPsec processing apparatuses 2a to 2f do not use the IKE. Therefore, it is unnecessary to set parameters for the IKE in the distribution policy.

All policies for other kinds of communication managed by the IPsec setting server 1 are set in the distribution policy storage section 16. In the example shown in FIG. 3, policies for communication between the IPsec processing apparatus 2d and the IPsec processing apparatus 2e are set in addition to those for the communication between the IPsec processing apparatus 2a and the IPsec processing apparatus 2b.

The SPD 24 is set for the respective IPsec processing apparatuses 2a to 2f. The usual setting of the IPsec is applied to the SPD 24 in order to encrypt communication with the IPsec setting server 1 using the IPsec. A selector column and an opposite party address for setting request column are set for communication to which the IPsec is actually desired to be applied.

FIG. 15 shows an example of the SPD 24 of the IPsec processing apparatus 2a. An entry of ID=1 is a setting for encrypting the communication with the IPsec setting server 1. This setting corresponds to the setting for the SPD 13 of the IPsec setting server 1. FIG. 16 shows contents of the application policy (z). The contents are the same as those of the policies set in the IPsec setting server 1 except an opposite party address, and a setting for the IKE is also included.

An entry of ID=2 is a setting for encrypting communication directed to the private network 202. The communication directed to the private network 202 is set in the selector column as communication to be a target, and the IPsec is set in the processing column. Here, the IPsec application policy column is omitted, and an address of the IPsec processing apparatus 2b is set in the opposite party address for setting request column.

All kinds of communication to which the IPsec processing apparatus 2a desires to apply the IPsec are set in the SPD 24. In the example shown in FIG. 15, a setting is made such that the IPsec communication is carried out with the IPsec processing apparatus 2c with respect to communication directed to the private network 203 in addition to the communication with the IPsec processing apparatus 2b.

The same settings as described above are applied to the IPsec processing apparatus 2b as well. That is, a setting for the IPsec setting server 1 is made in the SPD 24 together with an application policy, and a selector and an opposite party address for setting request are set for other kinds of IPsec communication.

These are the settings required in advance. FIG. 23 shows an example in which the same settings as described above are applied to the SPD of the conventional IPsec processing apparatus. In the conventional IPsec processing apparatus, the setting for the IPsec setting server 1 is unnecessary, an application policy including the setting for the IKE should be set for all kinds of communication to which the IPsec is applied. In the example shown in FIG. 23, an application policy (j) and an application policy (k) are set for communication directed to the private network 202 and communication directed to the private network 203, respectively. FIG. 24 shows contents of the application policy (j). The policy of the IKE is also set in the application policy (j) in addition to IPsec application policies such as an IPsec protocol and an encapsulation mode.

Here, in the case where n IPsec processing apparatuses carry out communication of the IPsec each other in all combinations of the apparatuses, a setting amount in the case where the IPsec setting server 1 in accordance with this embodiment is used and a setting amount necessary for the conventional IPsec processing apparatus are compared. When a setting for the policy of the IPsec and a setting for the policy of the IKE are counted as "1", respectively, in the conventional IPsec processing apparatus, since it is necessary to set (n−1) IPsec policies and IKE policies for one IPsec processing apparatus, a setting amount for one IPsec processing apparatus is 2 (n−1), and a setting amount for n IPsec processing apparatuses is 2n (n−1).

On the other hand, in the IPsec processing apparatuses 2 in accordance with this embodiment, since only one IPsec policy and one IKE policy are set for communication with the IPsec setting server 1, a setting amount for one IPsec processing apparatus is 2, and a setting amount for n IPsec processing apparatuses is 2n.

The IPsec setting server 1 needs a setting amount of 2n because one IPsec policy and one IKE policy are set for communication with the respective IPsec processing apparatuses 2 and also needs a setting amount of n(n−1)/2 because one IPsec policy is set for combinations of communication among the respective IPsec processing apparatuses 2. Thus, a setting amount necessary for the entire setting server 1 is 2n+n(n−1)/2.

Therefore, a setting amount in the case where the IPsec setting server 1 in accordance with this embodiment is used is 4n+n(n−1)/2=n(n+7)/2. For example, in the case of n=10, a setting amount of the present invention is 85 as opposed to a setting amount of 180 of the conventional method. Thus, about a half amount of setting is enough.

Taking notice of a coefficient of $n^2$, it is seen that, as n increases, the setting amount in this embodiment approaches ¼ of the setting amount of the conventional method, and that an effect of the present invention increases when there are more combinations.

Subsequently, operations after the IPsec processing apparatus 2a has received a packet directed to the private network 202 will be described. When the IPsec processing apparatus 2a receives a packet directed to the private network 202 from the interface section 21, the packet is given to the IPsec processing section 23.

The IPsec processing section 23 compares the selector of the SPD 24 and the received packet to find a corresponding entry. When the contents shown in FIG. 15 and the packet directed to the private network 202 are compared, the packet coincides with the entry of ID=2. The IPsec processing section 23 attempts application of the IPsec in accordance with a processing column of the entry. However, since the IPsec application policy is not set and an opposite party address for setting request is set instead of it, the IPsec processing section 23 suspends the IPsec application processing and requests the setting management section 26 to acquire a setting.

Upon receiving the request for acquiring a setting from the IPsec processing section 23, the setting management section 26 generates a request message for the SPD entry. FIG. 6 shows an example of the request message. The setting management section 26 sets arbitrary numerical values in an ID and an SPI, sets an address of the IPsec processing apparatus 2a itself in a request source address, and sets an address of the IPsec processing apparatus 2b which is an opposite party address for setting request of the SPD entry in an opposite party address.

The setting management section 26 transmits the generated request message to the IPsec setting server 1. After transmitting the request message to the IPsec setting server 1, the setting management section 26 repeats transmission of the request message at an interval of five seconds and, upon receiving a response corresponding to the request message from the IPsec setting server 1 or sending the request message six times, stops the transmission of the request message. By transmitting the request message repeatedly, the setting management section 26 can continue the processing with other request messages even in the case where one request message is lost.

When the request message is transmitted from the setting management section 26 to the IPsec setting server 1, the request message is subjected to the IPsec by the IPsec processing section 23 in accordance with the first entry of SPD 24 shown in FIG. 15 and, then, transmitted to the IPsec setting server 1. Thus, a message to be transmitted to the IPsec setting server 1 can be transmitted safely without being tapped by a third party on the Internet 100. Note that, since all messages to be transmitted from the respective IPsec processing apparatuses 2 to the IPsec setting server 1 are subjected to the IPsec and, then, transmitted in the same procedure, a description will be omitted for a procedure for applying the IPsec to a message transmitted to the IPsec setting server 1 in the following description.

The request message transmitted to the IPsec setting server 1 arrives at the interface section 11 of the IPsec setting server 1. The request message received in the interface section 11 is transmitted to the IPsec processing section 12. The IPsec processing section 12 decrypts the request message, which was encrypted by the IPsec, to the original state, and transmits the packet after decryption to the request processing section 15.

Note that, since all messages to be transmitted from the respective IPsec processing apparatus 2 to the IPsec setting server 1 reach the request processing section 15 in the same procedure, a description of a procedure from receiving a message in the interface section 11 until delivering it to the request processing section 15 will be omitted in the following description. Similarly, a description of a procedure for applying the IPsec to a message transmitted from the IPsec setting server 1 to the IPsec processing apparatus 2 will be omitted.

Upon receiving the request message (step S1 in FIG. 12), the request processing section 15 retrieves an entry with an address and an ID coinciding with those in the request message from the management table 17. However, since nothing is set in the management table 17 first, a coinciding entry is not found (steps S2, S7, and S9 in FIG. 12).

For new registration, the request processing section 15 retrieves a corresponding entry out of the distribution policy storage section 16 with a request source address and an opposite party address included in the request message as keys (step S21 in FIG. 13). Since the request source address and the opposite party address included in the request message are the IPsec processing apparatus 2a and the IPsec processing apparatus 2b, respectively, a front entry of the distribution policy storage section 16 shown in FIG. 3 coincide with the request message.

Since a coinciding entry is found in the distribution policy storage section 16, the request processing section 15 selects a new entry of the management table 17 and sets an address of the IPsec processing apparatus 2a, an address of the IPsec processing apparatus 2b, "1001" of the request ID, and "5100" of the SPI included in the request message in a request source address column, an opposite party address column, a request ID column, and an SPI column, respectively. The request processing section 15 sets an address of the IPsec processing apparatus 2b and an address of the IPsec processing apparatus 2a in another request source address and another opposite party address of the identical entry, respectively.

Moreover, the request processing section 15 sets a distribution policy (a) set in a corresponding entry of the distribution policy storage section 16 in a setting parameter column of the management table 17 (step S22 in FIG. 13). FIG. 25 shows the management table 17 in which the above-described settings are finished.

The request processing section 15 transmits a request startup message to the IPsec processing apparatus 2b which is the opposite party address (step S23 in FIG. 13). The request processing section 15 sets the address of the IPsec processing apparatus 2a, which is the transmission source address of the request message, in the request startup message as an opposite party address. FIG. 8 shows an example of the request startup message.

The request processing section 15 transmits the request startup message at an interval of five seconds up to six times until a request message is received from the IPsec processing apparatus 2b. By transmitting the request startup message repeatedly, the request processing section 15 can continue the processing with other request startup messages even in the case where one request startup message is lost.

The request startup message transmitted to the IPsec processing apparatus 2b arrives at the interface section 22 of the IPsec processing apparatus 2b. In the IPsec processing apparatus 2b, the request startup message received by the interface section 22 is transmitted to the IPsec processing section 23.

The IPsec processing section 23 decrypts the request startup message encrypted according to the IPsec to an original state and transmits a packet after decryption to the routing section 27. The routing section 27 judges that a destination of the message is the IPsec processing apparatus 2b itself and gives the request startup message to the setting management section 26. Note that, since all messages transmitted form the IPsec setting server 1 to the respective IPsec processing apparatuses 2 reach the setting management section 26 in the same procedure, a description of a procedure from receiving a message in the interface section 22 until delivering the message to the setting management section 26 will be omitted in the following description.

Upon receiving the request startup message from the IPsec setting server 1, the setting management section 26 retrieves an entry with an opposite party address for setting request coinciding with the address of the IPsec processing apparatus 2a out of the entries of the SPD 24. Since an entry for the IPsec processing apparatus 2a is set in the SPD 24 of the IPsec processing apparatus 2b in advance, the IPsec processing apparatus 2a coincides with the entry.

The setting management section 26 generates a request message in order to acquire policies of the entry. In the request message, the setting management section 26 sets the addresses of the IPsec processing apparatus 2b and the IPsec processing apparatus 2a in a request source address and an opposite party address, respectively. The setting management section 26 sets a request ID "2001" and an SPI "6100", which the setting management section 26 selected arbitrarily, in an ID and an SPI.

The setting management section 26 transmits the generated request message to the IPsec setting server 1. After transmitting the request message to the IPsec setting server 1, the setting management section 26 repeats transmission of the request message at an interval of five seconds and, upon receiving a response corresponding to the request message from the IPsec setting server 1 or transmitting the request message six times, stops the transmission of the request message.

The request message transmitted from the IPsec processing apparatus 2b arrives at the interface section 11 of the IPsec setting server 1 and is transferred to the request processing section 15. Upon receiving the request message from the IPsec processing apparatus 2b, the request processing section 15 stops the transmission of the request startup message, and starts reception processing of the request message (step S1 in FIG. 12).

The request processing section 15 retrieves an entry with an address and an ID coinciding with those included in the request message from the management table 17 shown in FIG. 25. However, there is no entry with a coinciding ID (step S2 in FIG. 12). In addition, there is no entry with coinciding address and SPI either (step S7 in FIG. 12).

Subsequently, the request processing section 15 retrieves an entry with a coinciding address and a blank ID in the management table 17 (step S9 in FIG. 12). Since a first entry shown in FIG. 25 corresponds to the entry, the request processing section 15 uses values included in the request message to set a request ID "2001" and an SPI "6100" in an ID column and an SPI column which are blank, respectively.

Moreover, the request processing section 15 generates an SA parameter for a forward direction from the IPsec processing apparatus 2a to the IPsec processing apparatus 2b and an SA parameter for an opposite direction (step S10 in FIG. 12). More specifically, the request processing section 15 sets contents identical with the distribution policy (a) for an IPsec protocol, an encapsulation mode, an encryption algorithm, an authentication algorithm, and a term of validity, and acquires random numbers from the random number generator 18 for an encryption key, an authentication key, and an IV and sets values.

In addition, the request processing section 15 sets an SPI, which is used by the IPsec processing apparatus 2 to be a reception side, in a reception side SPI column. FIG. 4 shows contents of the management table 17 after setting. For the first entry, "2001" is set in the column of the request ID, "6100" is set in the column of the SPI, and an SA parameter (a) and an SA parameter (b) are set in SA parameters for the respective directions. FIG. 5 shows contents of the SA parameter (a). The SA parameter (b) in the opposite direction has the same contents except that different random number values are used as the encryption key, the authentication key, and the IV and that a value of the reception side SPI is "5100" for the IPsec processing apparatus 2a.

The request processing section 15 uses contents of the setting parameter column of the management table 17 to generate a distribution message and transmits it to the IPsec processing apparatus 2a and the IPsec processing apparatus 2b, respectively (step S11 in FIG. 12).

At this point, the request processing section 15 uses values indicated in the entry of the management table 17 for a request source address, an opposite party address, and an ID to be set in the distribution message to be transmitted. Therefore, values of the request source address, the opposite party address, and the ID are the address of the IPsec processing apparatus 2a, the address of the IPsec processing apparatus 2b, and the request ID "1001", respectively, in the distribution message directed to the IPsec processing apparatus 2a, and are the address of the IPsec processing apparatus 2b, the address of the IPsec processing apparatus 2a, and the request ID "2001", respectively, in the distribution message directed to the IPsec processing apparatus 2b. FIG. 7 shows contents of the distribution message directed to the IPsec processing apparatus 2a.

After sending the distribution message, the request processing section 15 uses the timer 19 to measure a time which is the same as a term of validity of the SA parameters and, at the point when the timer 19 expires, deletes the entry of the management table 17.

The distribution message transmitted from the IPsec setting server 1 to the IPsec processing apparatus 2a arrives at the interface section 22 of the IPsec processing apparatus 2a and is transferred to the setting management section 26.

Upon receiving the distribution message from the IPsec setting server 1, the setting management section 26 of the IPsec processing apparatus 2a stops the transmission of the request message and sets an application policy included in the distribution message in the IPsec application policy column of the SPD 24. FIG. 26 shows contents of the SPD 24 after setting policies.

Moreover, the setting management section 26 uses SA parameters included in the distribution message to generate SAs for communication in both directions, respectively, and sets the SAs in the SAD 25. FIG. 17 shows contents of the SAD 25 in which an SA in a direction from the IPsec processing apparatus 2a to the IPsec processing apparatus 2b is set.

A first entry of the SAD 25 is a corresponding entry. The SA parameter (a) notified by the distribution message is set in the SAD 25 with the addition of a sequence number. The setting management section 26 also sets the SAD 25 for reception in the same manner in accordance with contents of the SA parameter (b) notified by the distribution message. At this point, the IPsec processing section 23 of the IPsec processing apparatus 2a can carry out processing of the IPsec with respect to the communication directed to the IPsec processing apparatus 2b.

Upon finishing the setting of the SPD 24 and the SAD 25, the setting management section 26 notifies the IPsec processing section 23 of completion of the processing. Upon receiving the notification of completion of the setting from the setting management section 26, the IPsec processing section 23 resumes the processing of the data communication packet which has been suspended. At this point, since an application policy of an entry of the SPD 24 and a corresponding entry of the SAD 25 exist, the IPsec processing section 23 can carry out the IPsec processing as in the past.

The packet subjected to the IPsec is transmitted to the IPsec processing apparatus 2b. Since entries are also set in the SPD 24 and the SAD 25 on the IPsec processing apparatus 2b side at the point when the distribution message is received from the IPsec setting server 1, decryption processing of the IPsec can be carried out in the conventional procedure at the point when the packet subjected to the IPsec is received from the IPsec processing apparatus 2a.

The packet subjected to the decryption processing by the IPsec processing section 23 of the IPsec processing apparatus 2b is transmitted to the private network 202 from the interface section 21. In this way, the packet transmitted from the private network 201 arrives at the private network 202.

A case will be described in which a packet from the private network 201 to the private network 202 is further generated continuously. The IPsec processing section 23 of the IPsec processing apparatus 2a retrieves the SPD 24 shown in FIG. 26 to confirm that policies already exist in a second entry, retrieves through the SAD 25 shown in FIG. 17 to confirm that the SA exists in a first entry, and uses the SA to carry out processing of the IPsec. That is, after acquiring setting parameters form the IPsec setting server 1, the IPsec processing section 23 operates in the same manner as the conventional IPsec.

Next, operations at the time of updating an SA will be described. The IPsec processing section 23 of the IPsec processing apparatus 2a monitors the SAD 25 and carries out update of an SA for an entry of which term of validity expires.

In updating an SA, the IPsec processing section 23 requests the setting management section 26 to acquire a setting. At this point, the IPsec processing section 23 notifies the setting management section 26 of an entry of the SPD 24 corresponding to the SA.

Upon receiving the request for acquiring a setting from the IPsec processing section 23, the setting management section 26 generates a request message for the SPD entry. In the request message, contents identical with the request message transmitted first are set except an ID and an SPI. New values are set for the ID and the SPI. Here, it is assumed that the setting management section 26 has selected "1002" and "5110" as values of the ID and the SPI, respectively.

The setting management section 26 transmits the generated request message to the IPsec setting server 1. After sending the request message to the IPsec setting server 1, the setting management section 26 repeats the transmission of the request message at an interval of five seconds and, upon receiving a response corresponding to the request message from the IPsec setting server 1 or sending the request message six times, stops the transmission of the request message.

The request message transmitted to the IPsec setting server 1 arrives at the interface section 11 of the IPsec setting server 1 and is delivered to the request processing section 15. Upon receiving the request message (step S1 in FIG. 12), the request processing section 15 retrieves an entry with an address and an ID coinciding with those of the request message from the management table 17. However, since both of an ID and an SPI have new values, no coinciding entry is found (steps S2 and S7 in FIG. 12). In addition, at this point, no entry with a blank ID exists either (step S9 in FIG. 12).

Subsequent operations are the same as the operations at the time when the request message was received for the first time. That is, the request processing section 15 retrieves the distribution policy storage section 16 (step S21 in FIG. 13) and registers an entry in the management table 17 anew (step S22 in FIG. 13). FIG. 4 shows contents of the management table 17 at this point. It is seen that an entry, in which an ID column and an SPI column are "1002" and "5100", respectively, is added in the second place.

The request processing section 15 transmits a request startup message to the IPsec processing apparatus 2b to be an opposite party (step S23 in FIG. 13). Upon receiving the request startup message, the IPsec processing apparatus 2b also sets a new ID and a new SPI and transmits a request message. Here, it is assumed that the IPsec processing apparatus 2b has selected "2002" and "6110" as the new ID and the new SPI, respectively.

Upon receiving the request message from the IPsec processing apparatus 2b (step S1 in FIG. 12), the request processing section 15 of the IPsec setting server 1 finds an entry with a coinciding address and a blank ID (step S9 in FIG. 12) and sets the ID and the SPI notified by the request message and the generated SA parameters in the management table 17 (step S10 in FIG. 12). FIG. 27 shows contents of the management table 17 at this point.

When the contents shown in FIG. 27 are compared with the contents shown in FIG. 4, it is seen that "2002" and "6110" are set in the blank ID and SPI columns and the SA parameters are also set. Moreover, the request processing section 15 generate a distribution message in accordance with the contents of the management table 17 and transmits it to the IPsec processing apparatus 2a and the IPsec processing apparatus 2b, respectively (step S11 in FIG. 12).

Upon receiving the distribution message, the setting management section 26 of each IPsec processing apparatus 2 sets policies notified by the distribution message in the SPD 24 and generates an SA from the notified SA parameters to set the SAD 25. At this point, the new SA is available and update of the SA is completed.

Here, a procedure according to the conventional IPsec and a procedure according to this embodiment are compared concerning processing after the IPsec processing apparatus 2 receives a first packet to which the IPsec is applied from the interface section 21 until the IPsec processing apparatus 2 actually performs the IPsec processing for the packet to transmit it to the interface section 22.

Figure 32:
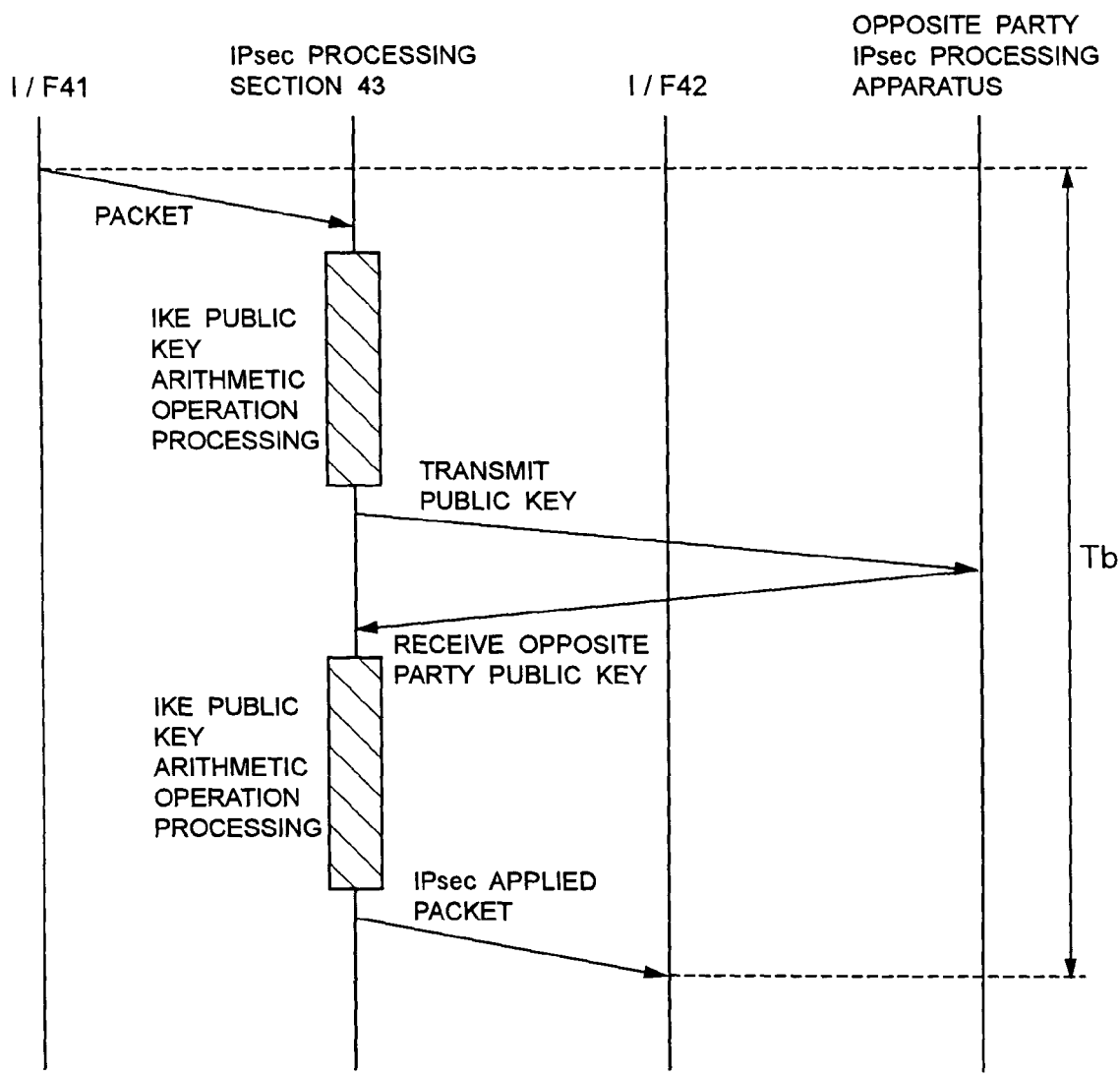
FIG. 32 is a sequence chart showing operations of the conventional IPsec processing apparatus.

In the conventional method, as shown in FIG. 32, upon receiving a packet from the interface section 41, the IPsec processing section 43 carries out an arithmetic operation of a public key according to the IKE and exchanges the public key with an IPsec processing apparatus to be an opposite party of communication. The IPsec processing section 43 further carries out an arithmetic operation of a secret key, applies the IPsec to the packet using the obtained secret key, and transmits the packet to the interface section 42.

On the other hand, in the procedure of this embodiment, as shown in FIG. 28, upon receiving a packet from the interface section 21, the IPsec processing section 23 requests the setting management section 26 to acquire a setting, and the setting management section 26 transmits a request message to the IPsec setting server 1.

Upon receiving the distribution message from the IPsec setting server 1, the setting management section 26 notifies the IPsec processing section 23 of completion of the setting, and the IPsec processing section 23 applies the IPsec to the packet and transmits it to the interface section 22.

A time spent since the interface section 21 receives the packet and performs the IPsec processing for the packet until the interface section 21 transmits the packet to the interface section 22, is assumed to be Tb and Ta for the conventional procedure and the procedure of this embodiment, respectively. At this point, it is seen that, since the arithmetic operation of the public key and the private key takes time in the conventional procedure, Tb is larger than Ta, and the packet can be transferred earlier in the procedure of this embodiment.

For example, in the case where a group to be used in the Diffie-Hellman key common algorithm of the IKE is assumed to be a 1536 bit MODP (Modular Exponentiation Group) and an RISC (Reduced Instruction Set Computer) processor of 50 MHz is used, Tb is approximately 18 seconds (actual measurement value), whereas Ta is less than one second.

More strictly, since the request message of the procedure of this embodiment is transmitted by the procedure of the conventional IPsec, at this point, Tb is smaller than Ta in the case where the key exchange of the IKE is carried out. However, for the subsequent IPsec communication, regardless of a combination of the IPsec processing apparatuses 2 to be opposite parties, Tb is larger than Ta while an SA of the IKE for the IPsec setting server 1 is valid.

In addition, in the case where the arithmetic operation of the public key or the secret key is carried out in the conventional method, since the IPsec processing apparatus concentrates on the arithmetic operation processing of the IKE, a transfer speed of a packet not required to be subjected to the IPsec decreases. Since the key exchange processing of the IKE is performed periodically for each communicating opposite party, a rate of decrease in processing ability increases when there are more opposite parties performing IPsec communication.

On the other hand, in the procedure of this embodiment, although the key exchange processing is performed periodically between the IPsec processing apparatuses 2 and the IPsec setting server 1, since the key exchange processing is not performed for each IPsec processing apparatus 2 to be an opposite party of communication, a rate of decrease in processing ability is constant even if opposite parties performing IPsec communication increase.

For example, in the case where a group to be used in the Diffie-Hellman key common algorithm of the IKE is assumed to be a 1536 bit MODP and a term of validity of an SA of the IKE is assumed to be one hour, and an RISC processor of 50 MHz is used, when the IPsec processing apparatus carries out IPsec communication with other 10 IPsec processing apparatuses, the key exchange of the IKE is carried out ten times in one hour in the conventional procedure, and performance decreases for approximately 180 seconds in one hour.

On the other hand, in the method of this embodiment, the key exchange is only carried out with the IPsec setting server 1, performance decreases only for approximately 18 seconds in one hour.

Figure 33:
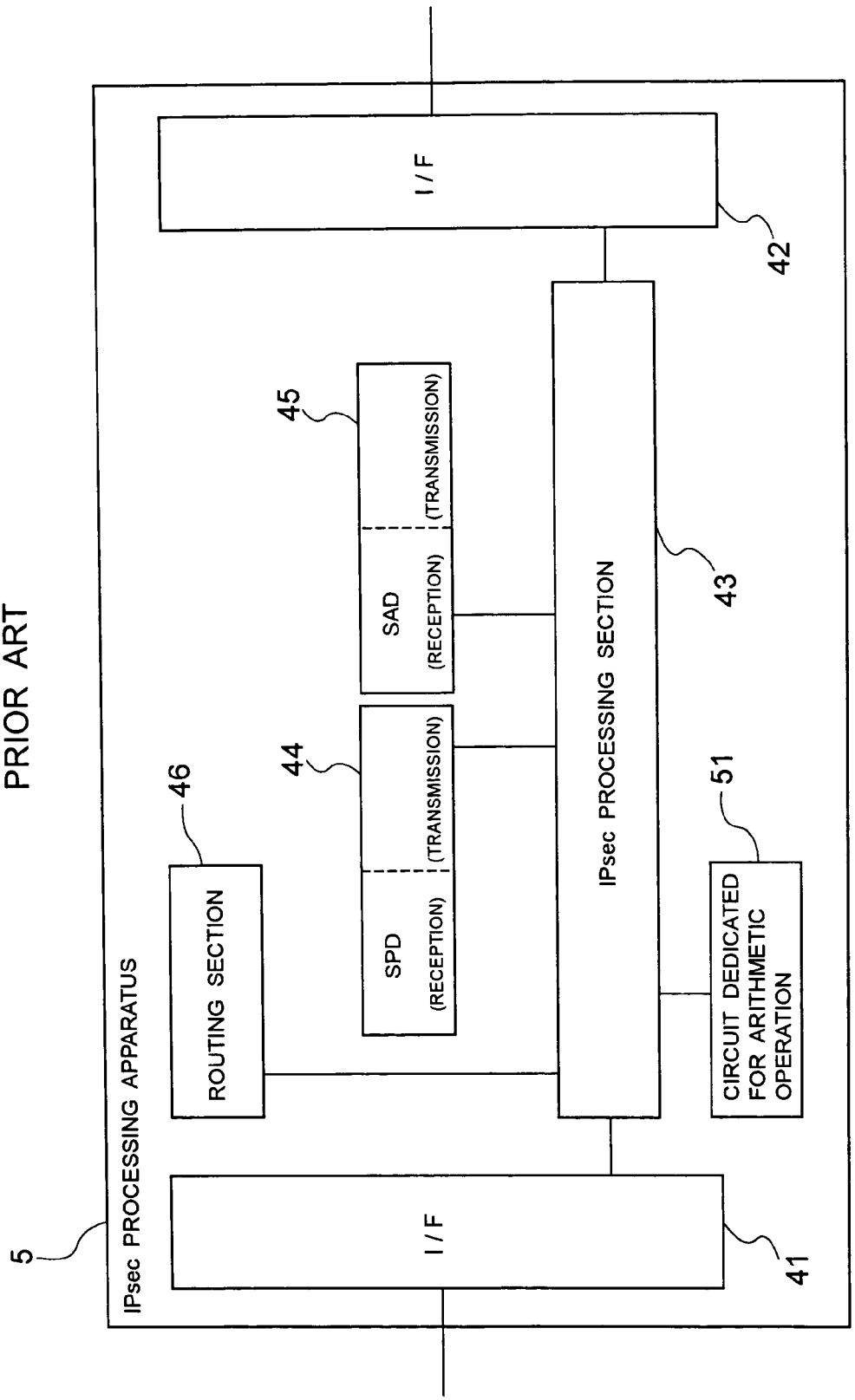
FIG. 33 is a block diagram showing another structure of the conventional IPsec processing apparatus.

As existing means for solving a problem due to an arithmetic operation processing speed of the IKE, there is a method of mounting a circuit dedicated for arithmetic operation on an IPsec processing apparatus to speed up the arithmetic operation processing itself of the IKE. FIG. 33 shows an example of the IPsec processing apparatus mounted with the circuit dedicated for arithmetic operation. The IPsec processing apparatus is different from the conventional IPsec processing apparatus 4 shown in FIG. 31 in that a circuit dedicated for arithmetic operation 51 is connected to the IPsec processing section 43.

When the arithmetic operation of the IKE is required, the IPsec processing section 43 requests the circuit dedicated for arithmetic operation 51 to perform an arithmetic operation. Since the arithmetic operation is carried out at a high speed by the circuit dedicated for arithmetic operation 51, a time required for the arithmetic operation processing of the conventional method shown in FIG. 32 is reduced, and a speed of the entire apparatus increases. If this means is used, it is possible to solve the problem due to the arithmetic operation speed of the IKE. However, in the case where an IPsec processing apparatus without the circuit dedicated for arithmetic operation 51 has already been installed, it is necessary to replace the IPsec processing apparatus itself with an IPsec processing apparatus with a circuit dedicated for arithmetic operation.

On the other hand, since all required functions can be realized by software in the method of this embodiment, it is possible to add a function through version-up of software for an IPsec processing apparatus already installed, and existing equipment can be utilized effectively.

In this way, in this embodiment, since information such as a service and an algorithm to be used is collectively set in the IPsec setting server 1, it becomes possible for the IPsec processing apparatuses 2 and 2a to 2f to acquire almost all settings from the IPsec setting server 1. Thus, a number of settings in the IPsec processing apparatuses 2 and 2a to 2f can be reduced.

In addition, in this embodiment, since the secret key is updated without using the IKE in the IPsec processing apparatuses 2 and 2a to 2f, settings for the IKE become unnecessary. Thus, a number of settings in the IPsec processing apparatuses 2 and 2a to 2f can be reduced.

Moreover, in this embodiment, since the IPsec setting server 1 is used, although in the prior art it is necessary to perform identical settings for apparatuses at both ends carrying out the IPsec, respectively, since contents which are set by the IPsec setting server 1 in the respective apparatuses only have to be set in its own apparatus, a total number of settings for the IPsec processing can be reduced.

In addition to the above, in this embodiment, since a request startup message is transmitted, in an IPsec processing apparatus opposed to an IPsec processing apparatus of a transmission source of a request message, setting of policies of the IPsec is performed substantially simultaneously with setting of policies of the IPsec in the IPsec processing apparatus of the transmission source. After the setting of the policies, when the IPsec processing apparatus of the transmission source encrypts and transmits a packet, the opposed IPsec processing apparatus can decrypt and receive the packet from the IPsec processing apparatus of the transmission source.

Consequently, in this embodiment, encryption and decryption after setting policies can be performed without delay, a packet from a transmission source can be received in an IPsec processing apparatus of a transmission destination without failure, and a time required until the packet from the transmission source is decrypted in an opposed IPsec processing apparatus can be reduced significantly.

In addition, in this embodiment, if a request message in response to a request startup message is not transmitted from an opposed IPsec processing apparatus at the time of transmission of the request startup message, since a no-response error message is transmitted to an IPsec processing apparatus of a transmission source, the IPsec processing apparatus of the transmission source can immediately recognize nonexistence of an opposed apparatus.

As described above, conventionally, since an identical setting needs to be made separately in apparatuses at both ends carrying out the IPsec, respectively, it is likely that inconsistency of setting contents occurs. However, in this embodiment, since the IPsec setting server 1 is used, the IPsec setting server 1 distributes an identical setting to apparatuses at both ends, and inconsistency of setting contents does not occur. Thus, connection failure due to inconsistency of setting of the IPsec is eliminated.

In addition, conventionally, a complicated arithmetic operation using the IKE is necessary in order to update a common secret key periodically. However, in this embodiment, since a common secret key is acquired from the IPsec setting server 1 instead of the IKE, it becomes unnecessary for apparatuses at both ends to perform an arithmetic operation of the common secret key. Thus, a time until communication can be started is reduced compared with the case where the IKE is used.

Similarly, conventionally, a complicated arithmetic operation using the IKE is necessary in order to update a common secret key periodically. However, in this embodiment, since a common secret key is acquired from the IPsec setting server 1 instead of the IKE, it becomes unnecessary for apparatuses at both ends to perform an arithmetic operation of the common secret key. Thus, arithmetic operation load on apparatuses carrying out the IPsec processing can be reduced compared with the case where the IKE is used.

FIG. 29 is a block diagram showing a structure of an IPsec processing apparatus in accordance with another embodiment of the present invention. FIG. 29 shows an application example in the case where an IPsec processing apparatus 3 is a personal computer rather than a router.

The IPsec processing apparatus 3 in accordance with another embodiment of the present invention has the same structure as the IPsec processing apparatus 2 in accordance with the embodiment of the present invention shown in FIG. 14 except that the interface section 21 is removed and an upper application section 31 is provided, and identical components are denoted by the identical reference numerals. In addition, operations of the identical components are the same as the embodiment of the present invention.

The upper application section 31 is an entity transmitting and receiving a data communication packet and is connected to the routing section 27. The routing section 27 judges whether a packet to be transmitted and received is directed to the upper application section 31, the setting management section 26, or the Internet 100 and transfers the packet to each destination.

Here, a case will be considered in which it is assumed that the IPsec processing apparatus 2d and the IPsec processing apparatus 2e in FIG. 1 are personal computers, and a packet is transmitted from the IPsec processing apparatus 2d to the IPsec processing apparatus 2e.

As in the case of a router, the IPsec setting server 1 is provided with the SPD 13 between the IPsec setting server 1 and the IPsec processing apparatuses 2d and 2e, respectively, in order to secure a safe path of the IPsec, and policies of the IPsec to be applied between the IPsec processing apparatus 2d and the IPsec processing apparatus 2e are set in the distribution policy storage section 16.

The SPD 24 is set in these IPsec processing apparatuses 2d and 2e. An ordinary setting of the IPsec is performed in order to encrypt communication with the IPsec setting server 1, and a selector and an opposite party address for setting request are set for communication to which the IPsec is actually desired to be applied.

In the case where a packet is transmitted from the IPsec processing apparatus 2d, a data communication packet is given to the routing section 27 from the upper application section 31 which is an entity transmitting and receiving the packet. The routing section 27 recognizes that a destination of the packet is on the Internet side, and transfers the packet to the IPsec processing section 23.

The subsequent procedure is the same as the embodiment in the case of a router. That is, the IPsec processing section 23 compares the selector of the SPD 24 and the packet to retrieve a corresponding entry and, if processing indicated in the corresponding entry is the IPsec, carries out application of the IPsec.

At this point, in the case where policies to which the IPsec is applied does not exist in the corresponding entry, the IPsec processing section 23 suspends the processing of the packet and requests the setting management section 26 to request setting. The setting management section 26 transmits a request message to the IPsec setting server 1 and receives a distribution message to thereby set the SPD 24 and the SAD 25, and notifies the IPsec processing section 23 of completion of the setting. The IPsec processing section 23 resumes the suspended processing of the packet and applies the IPsec to the packet using the set SA and, then, transfers the packet to the Internet 100 through the interface section 22.

A procedure at the time of reception is also substantially the same as the case of a router. In the IPsec processing apparatuses 2d and 2e, the SPD 24 and the SAD 25 have already been set by the setting management section 26. The packet subjected to the IPsec received through the interface section 22 is transferred to the IPsec processing section 23. The IPsec processing section 23 retrieves a corresponding SA from the SAD 25 and performs decryption processing of the packet.

The packet returned to its original state by the decryption processing is transferred to the routing section 27. The routing section 27 judges whether or not the packet is directed to the upper application section 31 or to the setting management section 26 and, if the packet is directed to the upper application section 31, transfers it to the upper application section 31.

In this way, the reception processing of the packet is completed. Therefore, this embodiment can be applied whether the IPsec processing apparatuses 2d and 2e are routers or personal computers.

FIG. 30 is a diagram showing stored contents of a distribution policy storage section in accordance with another embodiment of the present invention. In the embodiment of the present invention, it is necessary to set policies to be applied among the IPsec processing apparatuses 2 actually performing the IPsec communication in the distribution policy storage section 10 of the IPsec setting server 1 for each kind of communication. However, in another embodiment of the present invention, since common policies are used for several combinations of the IPsec processing apparatuses, the number of policies to be set in the distribution policy storage section 16 is reduced. Note that a structure of the IPsec setting server in accordance with another embodiment of the present invention is the same as the structure of the IPsec setting server 1 in accordance with the embodiment of the present invention shown in FIG. 2.

In this embodiment, the distribution policy storage section 16 is capable of setting policies for a combination of specific addresses and, at the same time, setting policies in an arbitrary combination. In the example shown in FIG. 30, policies to be applied to communication between the IPsec processing apparatus 2d and the IPsec processing apparatus 2e and policies to be applied to all the other combinations are set. In the case of this embodiment, since many IPsec processing apparatuses 2 uses common policies, the number of policies to be set in the distribution policy storage section 16 can be reduced.

Here, in the case where n IPsec processing apparatuses carry out communication of the IPsec each other in all the combinations of the IPsec processing apparatuses, a setting amount necessary for this embodiment and a setting amount necessary for the conventional IPsec processing apparatus will be compared. In this case, it is assumed that identical policies are applied in all combinations of the IPsec communication.

A total of the setting amount necessary for the conventional IPsec processing apparatus is 2n (n−1) as calculated earlier. On the other hand, in this embodiment, regardless of the number of combinations of communication among the IPsec processing apparatuses, only one setting amount of IPsec policies is sufficient. Therefore, the setting amount required in this embodiment is 4n+1.

As it is seen from this, the setting amount increases in proportion to the square of n in the conventional method, whereas, in this embodiment, since the setting amount increases in proportion to n, an effect increases as the number of combinations increases. For example, in the case of n=10, the setting amount of the conventional method is 180, whereas the setting amount of this embodiment is 41. It is seen that setting is reduced to approximately ¼.

As described above, in the apparatus and method of the present invention, since policies of the IPsec to be applied among IPsec processing apparatuses are collectively managed, there is an effect that inconsistency of settings among communicating apparatuses can be prevented.

In addition, in another apparatus and method of the present invention, in the case where a request message is received, since a request startup message is transmitted to an IPsec processing apparatus, which is an opposite party of communication of an IPsec processing apparatus which has set the request message, in order to cause the IPsec processing apparatus to transmit a request message for the communication, there is an effect that encryption and decryption after setting policies can be performed without delay, and a packet can be received from a transmission source without failure.

Moreover, in another apparatus and method of the present invention, since a common secret key to be used in encryption and decryption of the IPsec is generated and the generated common secret key is distributed to IPsec processing apparatuses, there is an effect that an arithmetic operation of a common secret key is made unnecessary, a connection time of an IPsec path at the time of starting communication in the respective apparatuses can be reduced, and decrease in performance can be prevented.

What is claimed is:

1. A network comprising:
   IPsec processing apparatuses, which use an IPsec (Internet Protocol security protocol) for encrypting and authenticating communications via the Internet between two different centers; and
   an IPsec setting apparatus, which manages IPsec settings of the IPsec processing apparatuses,
   wherein in response to receiving a request from a first IPsec processing apparatus to communicate with a second IPsec processing apparatus, the IPsec setting apparatus transmits a request to the second IPsec processing apparatus and upon receiving a reply to the request from the second IPsec processing apparatus the IPsec setting apparatus transmits a common encryption key to the first and second IPsec process apparatuses to be used to encrypt and authenticate IPsec communications between the first and second process apparatuses;
   wherein said IPsec setting apparatus generates SA (Security Association) parameters, to be used in the IPsec communication between the first and the second IPsec processing apparatuses, based on the contents of the request message and contents of IPsec policies stored by the IPsec setting apparatus;
   wherein said IPsec setting apparatus sends a distribution message including the policies of said IPsec and the SA parameters in response to the request message; and
   wherein the IPsec processing apparatus retransmits the request for communication to the IPsec setting apparatus and receives new setting information before a term of validity for the SA expires,
   wherein said IPsec setting apparatus generates the common encryption key to be used in encryption and authentication of the IPsec communications between the first IPsec processing apparatus and the second IPsec processing apparatus and transmits the generated common encryption key to the IPsec processing apparatus.

2. The network of claim 1,
   wherein the second IPsec processing apparatus transmits a request for the communication message as a reply to the request received from the IPsec setting apparatus.

3. The network of claim 1,
   wherein when there is no response from the second IPsec to the request from the IPsec setting apparatus the IPsec setting apparatus notifies the first IPsec processing apparatus that there is no response from said second IPsec processing apparatus.

4. The network of claim 1 wherein the common encryption key transmitted by the IPsec setting apparatus in response to the request depends on an address of the first IPsec processing apparatus making the request.

5. The network of claim 1 wherein the common encryption key transmitted by the IPsec setting apparatus in response to the request depends on an address of the second IPsec processing apparatus for which communication is requested.

6. The network of claim 1 wherein the common encryption key transmitted by the IPsec setting apparatus in response to the request depends on addresses of the first IPsec processing apparatus making the request and the second IPsec processing apparatus for which communication is requested.

7. The network of claim 1 wherein all communications between the first IPsec processing apparatus and the IPsec setting apparatus are encrypted, and all communications between the second IPsec processing apparatus and the IPsec setting apparatus are encrypted.

8. An IPsec setting apparatus managing IPsec setting of IPsec processing apparatuses, which use an IPsec (Internet Protocol security protocol) for securing communication via the Internet between two different centers,
   wherein said IPsec setting apparatus manages IPsec policies applied among the IPsec processing apparatuses,
   wherein said IPsec setting apparatus specifies the IPsec policies to be applied between a first IPsec processing apparatus, requesting communication with a second IPsec processing apparatus, and the second IPsec processing apparatus, based upon contents of the request to the IPsec setting apparatus from the first IPsec processing apparatus for communication with the second IPsec processing apparatus, said IPsec setting apparatus generating a common encryption key to be used in encryption and authentication of IPsec communication and distributes the generated common encryption key to the first and second IPsec processing apparatuses;
   wherein said IPsec setting apparatus generates SA (Security Association) parameters used in the IPsec communication between the first IPsec processing apparatus and the second IPsec processing apparatus based upon the contents of the request message and contents of the IPsec policies stored by the IPsec setting apparatus;
   wherein said IPsec setting apparatus simultaneously transmits to the first IPsec processing apparatus and to the second IPsec processing apparatus a message including at least the policies and the SA parameters for IPsec communication between the first IPsec processing apparatus and the second IPsec processing apparatus in response to the request message; and
   wherein the first IPsec processing apparatus retransmits the request for communication to the IPsec setting apparatus and receives new setting information before a term of validity for the SA expires,
   wherein said IPsec setting apparatus generates the common encryption key to be used in encryption and authentication of the IPsec communications between the first IPsec processing apparatus and the second IPsec processing apparatus and transmits the generated common encryption key to the IPsec processing apparatus.

9. The IPsec setting apparatus of claim 8,
wherein said IPsec setting apparatus upon receiving the request message from the first IPsec processing apparatus, transmits a request startup message to the second IPsec processing apparatus, which is an opposite party of communication of the first IPsec processing apparatus which has transmitted the request message, in order to cause the second IPsec processing apparatus to transmit a request message for the communication.

10. The IPsec setting server apparatus of claim 9,
wherein the IPsec setting apparatus, when there is no response to the request startup message from the second IPsec processing apparatus, notifies the first IPsec processing apparatus which has transmitted the request message that there is no response from the second IPsec processing apparatus of the opposite party of communication.

11. An IPsec processing apparatus using an IPsec (Internet Protocol security protocol) on the Internet,
wherein said IPsec processing apparatus receives from an IPsec setting apparatus managing communication a packet containing the IPsec to be applied to communications with another IPsec processing apparatus, determines whether or not to request from the IPsec setting apparatus a setting for IPsec communication, and wherein the IPsec processing apparatus transmits a request for communication with the other IPsec processing apparatus to the IPsec setting apparatus in order to receive from the IPsec setting apparatus a setting for IPsec communication, the IPsec processing apparatus received from the IPsec setting apparatus a common encryption key to be used in encryption and authentication of said IPsec communication; and
wherein said IPsec processing apparatus includes means for setting an SPD (Security Processing Database), in which policies for applying said IPsec is recorded, and an SAD (Security Association Database), in which an SA (security Association) necessary for subjecting an individual communication to the IPsec processing is stored, based upon a message received from the IPsec setting apparatus; and
wherein said IPsec processing apparatus retransmits the request for communication to the IPsec setting apparatus and receives new setting information before a term of validity for the SA expires,
wherein said IPsec processing apparatus receives the common encryption key generated by said IPsec setting apparatus to be used in encryption and authentication of the IPsec communications between said IPsec processing apparatus and the other IPsec processing apparatus.

12. The IPsec processing apparatus of claim 11,
wherein, upon receiving a request startup message from an IPsec setting apparatus the IPsec processing apparatus transmits a request for communication with another IPsec processing apparatus to the IPsec setting apparatus.

13. An IPsec setting method for a network comprising:
receiving from a first IPsec processing apparatus a request for communication with a second IPsec processing apparatus;
in response to the received request, sending a request to the second IPsec processing apparatus,
receiving a reply to the sent request from the second IPsec processing apparatus,
in response to the reply from the second IPsec processing apparatus, retrieving IPsec policy rules from memory based on the content of the request from the first IPsec processing apparatus and the retrieved policy rules, generating a common encryption key to be used in encryption and authentication of IPsec communication between the first and second IPsec processing apparatuses;
transmitting the generated common encryption key to first and second IPsec processing apparatuses;
in response to a reply from the second IPsec processing apparatus, generating SA (Security Association) parameters to be used in the IPsec communication between the first and second IPsec processing apparatuses based on contents of the request from the first IPsec processing apparatus message and the retrieved policy rules;
transmitting a distribution message including at least the retrieved policies and generated SA parameters in response to receiving the request; and
receiving a second request from the first IPsec processing apparatus for communication with the second IPsec processing apparatus before a term of the validity of an SA (Security Association) parameter expires, and in response, generating and transmitting new IPsec setting to the first and second IPsec processing apparatuses,
wherein the common encryption key is generated to be used in encryption and authentication of the IPsec communications between the first IPsec processing apparatus and the second IPsec processing apparatus; and
transmitting the generated common encryption key from said IPsec setting apparatus to the IPsec processing apparatus.

14. The IPsec setting method of claim 13,
wherein the request sent to the second IPsec is a startup message and the reply received from the second IPsec is a request for the communication.

15. The IPsec setting method of claim 13,
wherein when there is no reply to the request sent to the second IPsec processing apparatus, notifying the first IPsec processing apparatus that there is no response from the second IPsec processing apparatus.

16. The IPsec setting method of claim 13,
further compromising, upon receiving at one of the first and second IPsec processing apparatuses a communication to which an IPsec should be applied, the IPsec processing apparatus determines whether or not to request an IPsec setting from an IPsec setting apparatus.

17. The IPsec setting method of claim 13,
wherein the first IPsec processing apparatus transmits a request for communication with the second IPsec processing apparatus to an IPsec setting apparatus in order to acquire a setting for the IPsec to be used during the communication.

18. The IPsec setting method of claim 13,
wherein the IPsec processing apparatuses store the retrieved policies transmitted in the distribution message in a respective SPD, and store the SA parameters transmitted in the distribution message in a respective SAD.

* * * * *